(12) United States Patent
Kuroda

(10) Patent No.: US 11,349,522 B2
(45) Date of Patent: May 31, 2022

(54) COMMUNICATION CIRCUIT AND COMMUNICATION METHOD

(71) Applicant: KEIO UNIVERSITY, Tokyo (JP)

(72) Inventor: Tadahiro Kuroda, Yokohama (JP)

(73) Assignee: KEIO UNIVERSITY, Tokyo (JP)

( * ) Notice: Subject to any disclaimer, the term of this patent is extended or adjusted under 35 U.S.C. 154(b) by 0 days.

(21) Appl. No.: 17/268,524

(22) PCT Filed: Aug. 9, 2019

(86) PCT No.: PCT/JP2019/031686
§ 371 (c)(1),
(2) Date: Feb. 15, 2021

(87) PCT Pub. No.: WO2020/036149
PCT Pub. Date: Feb. 20, 2020

(65) Prior Publication Data
US 2021/0226662 A1  Jul. 22, 2021

(30) Foreign Application Priority Data
Aug. 17, 2018  (JP) .............................. JP2018-153639

(51) Int. Cl.
*H04B 1/44* (2006.01)
*H04L 5/16* (2006.01)

(52) U.S. Cl.
CPC ................. *H04B 1/44* (2013.01); *H04L 5/16* (2013.01)

(58) Field of Classification Search
CPC . H04B 1/38; H04B 1/40; H04B 1/401; H04B 1/44; H04B 1/48; H04L 5/14;
(Continued)

(56) References Cited
U.S. PATENT DOCUMENTS 5,313,198 A * 5/1994 Hirao ..................... H04B 5/00
340/12.1
5,437,057 A * 7/1995 Richley .................. H04B 5/02
455/524
(Continued)

FOREIGN PATENT DOCUMENTS
EP         2146304 A1    1/2010
JP      H04-37447 B2    6/1992
(Continued)

OTHER PUBLICATIONS

Japan Patent Office (ISA/JP), International Search Report, International Application No. PCT/JP2019/031686, 5 pages (dated Oct. 21, 2019).

*Primary Examiner* — Quochien B Vuong
(74) *Attorney, Agent, or Firm* — Thompson Hine LLP

(57) ABSTRACT

A communication circuit including a first coupler, a transmission-data change detector configured to detect a change in transmission data input to a transmitter, and a received-data change detector configured to detect a change in received data output from a receiver. In a standby state in which the received-data change detector and the transmission-data change detector do not detect changes in the received data and the transmission data, an input side of the receiver is connected to the first coupler and an output side of the receiver is disconnected from the first port in a receiving path; and an input side of the transmitter is connected to the first port and an output side of the transmitter is disconnected from the first coupler in a transmitting path.

11 Claims, 18 Drawing Sheets

(58) Field of Classification Search
CPC . H04L 5/1469; H04L 5/16; H04L 5/05; H04L 5/1461

See application file for complete search history.

(56) References Cited

U.S. PATENT DOCUMENTS

| | | | |
|---|---|---|---|
| 10,397,921 B2* | 8/2019 | Kusashima | H04L 1/18 |
| 11,108,426 B2* | 8/2021 | Bontu | H04B 1/44 |
| 2001/0050905 A1* | 12/2001 | Shin | H04L 5/16 370/296 |
| 2011/0156488 A1 | 6/2011 | Kuroda | |
| 2013/0324044 A1 | 12/2013 | Kuroda et al. | |
| 2015/0207541 A1 | 7/2015 | Kuroda | |

FOREIGN PATENT DOCUMENTS

| | | | |
|---|---|---|---|
| JP | 2002-314465 A | 10/2002 | |
| JP | 2009-295699 A | 12/2009 | |
| JP | 5213087 B2 | 6/2013 | |
| JP | 2014-033432 A | 2/2014 | |

* cited by examiner

COMMUNICATION CIRCUIT AND COMMUNICATION METHOD

This application is a national stage filing of PCT international application number PCT/JP2019/031686 (corresponding to Publication No. WO 2020/036149) filed on Aug. 9, 2019 and entitled Communication Circuit and Communication Method, which claims priority to Japan patent application number 2018-153639 filed on Aug. 17, 2018. The entire contents of both of those application are incorporated by reference herein.

FIELD

The present invention relates to a communication circuit using electromagnetic coupling, and a communication method therefor, and in particular to a communication circuit capable of performing half-duplex communication without using a timing signal for switching between transmission and reception, and a communication method therefor.

BACKGROUND

The half-duplex communication is two-way communication which is performed between two modules in a time-sharing manner. Specifically, the half-duplex communication is a method in which the direction of communication is switched according to the time so that one of the modules performs transmission and the other module performs reception. The half-duplex communication is used in a USB (Universal Serial Bus) that connects a computer with a peripheral device, and in an HDMI (Registered Trademark) (High Definition Multimedia Interface) that connects a computer with a display device. For example, mutual authentication is carried out between two apparatuses, or a key for restoring encrypted data or scrambled video data is exchanged between two apparatuses.

Connectors are used to connect apparatuses with each other through a USB or an HDMI. In ordinary crimping-connection type connectors, there are, for example, the following problems; namely, a signal is reflected at the connector, thus making high-speed communication impossible, and the size of the apparatus cannot be reduced. To solve these problems in ordinary connectors, the inventors of the present application proposed a non-contact connector for wireless communication of digital data (see, for example, Patent Literatures 1 and 2.).

In the inter-module communication apparatus disclosed in Patent Literature 1, transmission lines are formed on printed circuit boards (Printed Circuit Boards; PCBs). The transmission lines formed on the two printed circuit boards are arranged so that they overlap each other as viewed in a projected manner in the direction in which these printed circuit boards are stacked on top of each other. In this manner, it is possible to form capacitive coupling and/or inductive coupling between the two transmission lines. Signals are transmitted and received through a coupler formed by the capacitive coupling and/or the inductive coupling (hereinafter referred to as an electromagnetic coupler). A receiver restores a received signal transmitted through the coupler to the original signal by using a hysteresis comparator (paragraph [0191]).

Patent Literature 2 discloses a configuration in which a pair of input/output connection lines are connected to a coupler so that the coupler has a differential configuration (FIG. 2).

Further, Patent Literature 3 discloses a bidirectional bus/buffer. In the bidirectional bus/buffer disclosed in Patent Literature 3, digital signals are input to both ports. Further, a control signal for controlling a timing is used.

CITATION LIST

Patent Literature 1: Japanese Patent Publication No. 5213087
Patent Literature 2: Japanese Unexamined Patent Application Publication No. 2014-33432
Patent Literature 3: Japanese Examined Patent Application Publication No. H4-37447

SUMMARY

When a digital signal is received through an electromagnetic coupler, its DC (Direct Current) component is lost, so that the digital signal becomes a pulse signal having a small amplitude. A receiving circuit that restores the pulse signal having the small amplitude to the digital signal cannot be connected to and used simultaneously with a transmitting circuit that transmits the digital signal. This is because the amplitude of a digital signal is larger than that of a received signal, so that even if the receiving circuit receives a pulse signal having a small amplitude while the transmitting circuit is outputting a digital signal, the receiving circuit cannot detect that pulse signal.

By using a timing signal for switching between transmission and reception used in half-duplex communication, the output of the transmission circuit can be brought into a High-Z state (a high-impedance state) during the receiving operation, so that the reception circuit can detect a received signal. However, in general, it is very difficult to extract such a timing signal in a connector located halfway through the transmission line. Therefore, an object of the present invention is to make it possible to perform half-duplex communication without obtaining a timing signal for switching between transmission and reception (i.e., to asynchronously perform half-duplex communication).

A communication circuit according to an embodiment includes: a first coupler configured to be electromagnetically coupled to a coupler of an entity with which the communication circuit communicates; a first port configured to receive transmission data transmitted from the first coupler and output received data received by the coupler; a transmitting path through which the transmission data is transmitted from the first port to the first coupler; a receiving path through which the received data is transmitted from the first coupler to the first port; a transmitter disposed in the transmitting path, the transmitter being configured to output the transmission data received from the first port to the first coupler; a receiver disposed in the receiving path, the receiver being configured to restore the received data received through the first coupler; a transmission-data change detector configured to detect a change in the transmission data input to the transmitter in the transmitting path; and a received-data change detector configured to detect a change in the received data output from the receiver in the receiving path, in which in a receiving state in which the received-data change detector detects a change in the received data, the first port is connected to the first coupler through the receiving path, and the transmitter is disconnected from the first port and the first coupler in the transmitting path, in a transmitting state in which the transmission-data change detector detects a change in the transmission data, the first port is connected to the first coupler through the transmitting path, and the first port is disconnected from the receiver in the receiving path, and in a standby state in which the received-data change detector and the transmission-data change detector detect no change in the received data and the transmission data, an input side of the receiver is connected to the first coupler and an output side of the receiver is disconnected from the first port in the receiving path, and an input side of the transmitter is connected to the first port and an output side of the transmitter is disconnected from the first coupler in the transmitting path.

In the above-described communication circuit, when the state of the communication circuit changes from the transmitting state to the standby state, the output side of the transmitter can be disconnected from the first coupler so that a change in an output of the transmitter is not detected in the receiver of the entity.

In the above-described communication circuit, the transmission-data change detector can output N detection signals, and when the state of the communication circuit changes from the transmitting state to the standby state, an impedance between the output side of the transmitter and the first coupler is preferably increased in a stepwise manner according to the N detection signals.

The above-described communication circuit can further include a transmitting-side output switch disposed between the transmitter and the first coupler, in which when the state of the communication circuit changes from the transmitting state to the standby state, an impedance of the transmitting-side output switch can be gradually increased.

In the above-described communication circuit, the transmitter can be a three-state (3-state) transmitter capable of outputting an H-level, an L-level, and a Hi-Z; in the receiving state, an output of the three-state transmitter can become the Hi-Z, so that the transmitter is disconnected from the first coupler; and when the state of the communication circuit changes from the transmitting state to the standby state, an impedance of the three-state transmitter can be gradually increased.

The above-described communication circuit can further include:

a transmitting-side input switching circuit configured to switch a state of the transmitting path between a disconnected state and a connected state between the transmitter and the first port according to a detection signal received from the received-data change detector; and a receiving-side output switching circuit configured to switch a state of the receiving path between a disconnected state and a connected state between the receiver and the first port according to the detection signal received from the received-data change detector.

In the above-described communication circuit, the transmitting-side input switching circuit can be a latch or a switch with a keeper, and the receiving-side output switching circuit can be a latch or a switch with a keeper.

The above-described communication circuit can further include a receiving-side input switching circuit configured to switch a state of the receiving path between a connected state and a disconnected state between the first coupler and the receiving-side output switching circuit according to a detection signal received from the transmission-data change detector.

The above-described communication circuit can further include a receiving-side output switch configured to switch a state of the receiving path between a connected state and a disconnected state between the receiver and the first coupler according to a detection signal received from the transmission-data change detector.

The above-described communication circuit may further include a second coupler connected to the first port, in which data received by the second coupler may be transmitted as the transmission data to the first coupler through the transmitting path; and data received by the first coupler may be transmitted as the received data to the second coupler through the receiving path.

A communication method according to an embodiment is a communication method performed by a communication circuit, the communication circuit including: a first coupler configured to be electromagnetically coupled to a coupler of an entity with which the communication circuit communicates; a first port configured to receive transmission data transmitted from the first coupler and output received data received by the coupler; a transmitting path through which the transmission data is transmitted from the first port to the first coupler; a receiving path through which the received data is transmitted from the first coupler to the first port; a transmitter disposed in the transmitting path, the transmitter being configured to output the transmission data received from the first port to the first coupler; a receiver disposed in the receiving path, the receiver being configured to restore the received data received through the first coupler; a transmission-data change detector configured to detect a change in the transmission data input to the transmitter in the transmitting path; and a received-data change detector configured to detect a change in the received data output from the receiver in the receiving path, in which in a receiving state in which the received-data change detector detects a change in the received data, the first port is connected to the first coupler through the receiving path, and the transmitter is disconnected from the first port and the first coupler in the transmitting path, in a transmitting state in which the transmission-data change detector detects a change in the transmission data, the first port is connected to the first coupler through the transmitting path, and the first port is disconnected from the receiver in the receiving path, and in a standby state in which the received-data change detector and the transmission-data change detector detect no change in the received data and the transmission data, an input side of the receiver is connected to the first coupler and an output side of the receiver is disconnected from the first port in the receiving path, and an input side of the transmitter is connected to the first port and an output side of the transmitter is disconnected from the first coupler in the transmitting path.

According to the communication circuit and the communication method in accordance with this embodiment, half-duplex communication can be performed without using a timing signal for switching between transmission and reception.

DETAILED DESCRIPTION

First Embodiment

Figure 1:
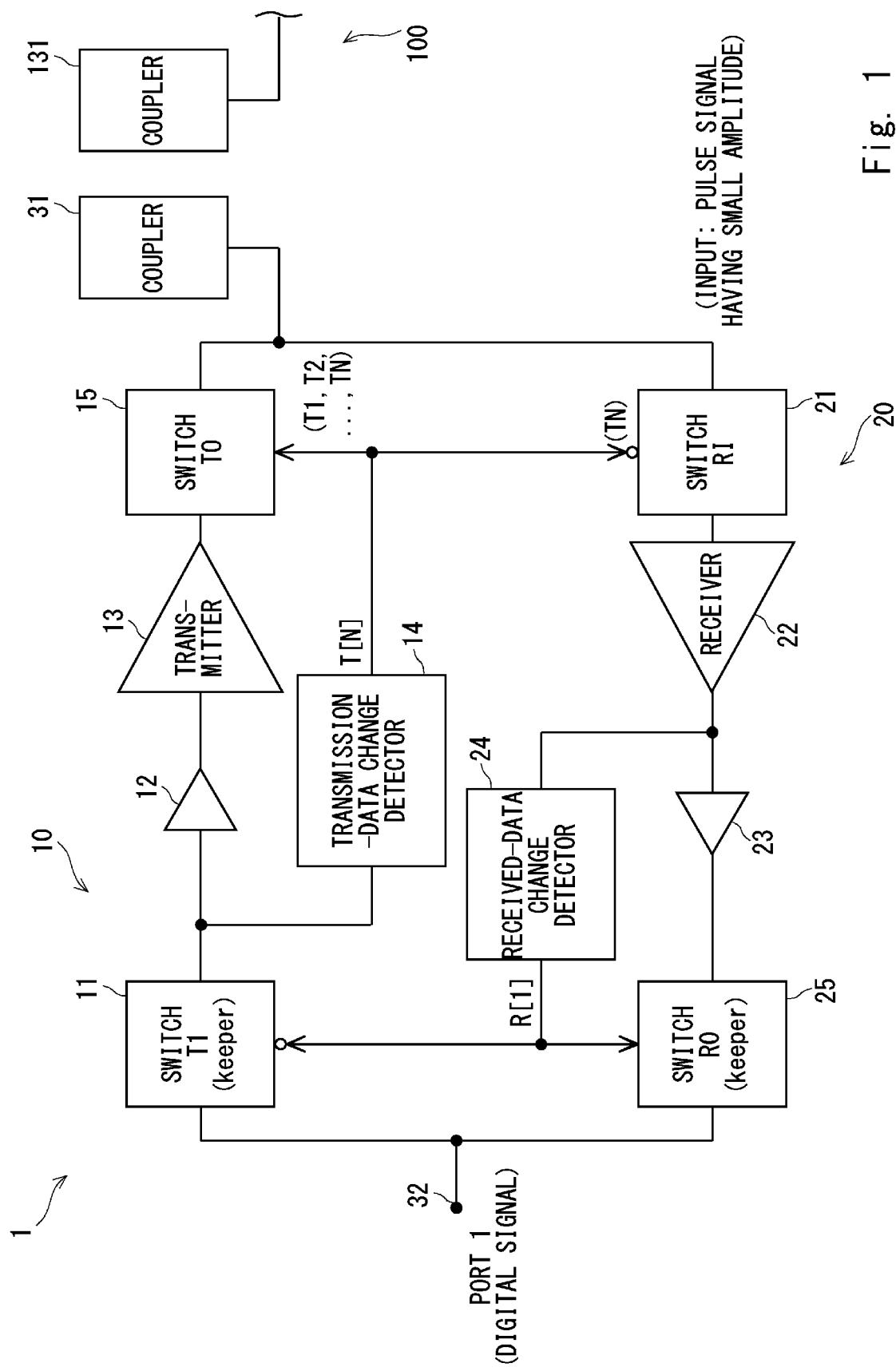
FIG. 1 is a block diagram showing a configuration of a communication circuit according to a first embodiment.
Figure 2:
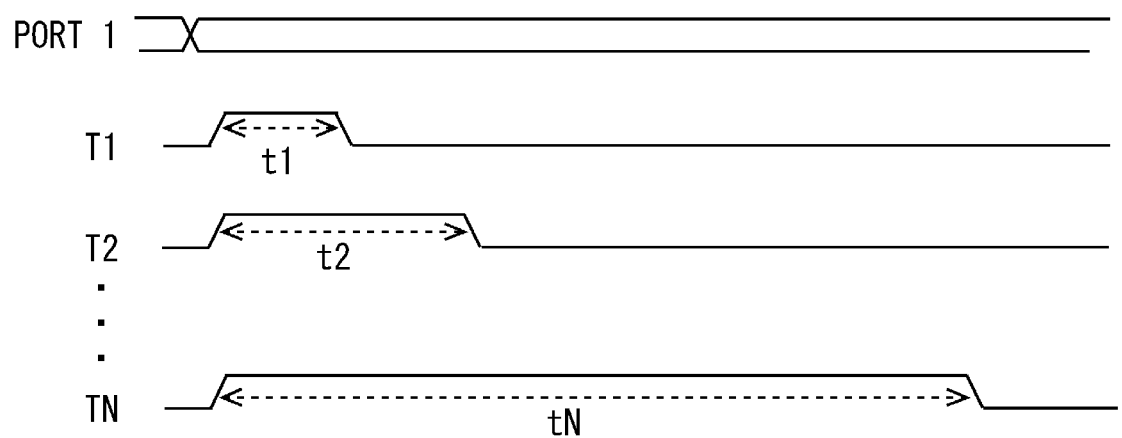
FIG. 2 shows signal waveforms in the communication circuit.

Embodiments according to the present invention will be described hereinafter with reference to the drawings. FIG. 1 is a block diagram showing a configuration of a communication circuit according to a first embodiment. FIG. 2 is a diagram showing signal waveforms in the communication circuit 1. As shown in FIG. 1, the communication circuit 1 includes a transmitting path 10, a receiving path 20, a first coupler 31, and a port 32. The transmitting path 10 and the receiving path 20 are connected in parallel between the first coupler 31 and the first port 32 (indicated as a PORT 1 in the figure).

Note that since FIG. 1 shows a single-end signal configuration, digital data of 0 or 1 is expressed by high/low of a signal level with respect to a reference voltage. Needless to say, differential signals may be used instead of using the single-end signal. When differential signals are transmitted, the transmitting path 10 includes two transmission lines and the receiving path 20 includes two transmission lines.

The communication circuit 1 performs half-duplex communication with a communication circuit 100 which is an entity with which the communication circuit 1 communicates. Specifically, the first coupler 31 of the communication circuit 1 is coupled to a coupler 131 of the communication circuit 100 in a non-contact manner. Each of the first coupler 31 and the coupler 131 is, for example, an electromagnetic coupler shown in Patent Literature 1 or 2. The first coupler 31 and the coupler 131 can be, for example, transmission lines that are arranged parallel to each other so that they are coupled as a distributed constant system with an electric field and a magnetic field. Alternatively, the first coupler 31 and coupler 131 can be coils (inductive couplers) that are arranged so as to overlap each other so that they are magnetically coupled (inductively coupled) as a lumped constant system. Alternatively, the first coupler 31 and the coupler 131 can be electrodes that are arranged parallel to each other so that they are magnetically coupled (inductively coupled) as a lumped constant system. Note that a configuration similar to that of the communication circuit 1 can be used as the configuration of the communication circuit 100, and therefore the description thereof is omitted.

Through the transmitting path 10, transmission data is transmitted from the first port 32 to the first coupler 31. Then, the communication circuit 1 transmits the transmission data to the communication circuit 100 by using electromagnetic coupling between the first coupler 31 and the coupler 131. Further, the communication circuit 1 receives the transmission data from the communication circuit 100 by using the electromagnetic coupling between the first coupler 31 and the coupler 131. Through the receiving path 20, the received data is transmitted from the first coupler 31 to the first port 32.

In the transmitting path 10, as enumerated from the first port 32 side, a transmitting-side input switch 11 (a switch TI in FIG. 1), a buffer 12, a transmitter 13, and a transmitting-side output switch 15 (a switch TO in FIG. 1) are provided. The transmitter 13 performs processing such as amplification for the transmission data. Further, a transmission-data change detector 14 is connected to a node between the transmitting-side input switch 11 and the buffer 12 in the transmitting path 10.

In the receiving path 20, as enumerated from the first coupler 31 side, a receiving-side input switch 21 (a switch RI in FIG. 1), a receiver 22, a buffer 23, and a receiving-side output switch 25 (a switch RO in FIG. 1) are provided. The first coupler 31 and the coupler 131 are coupled to each other by an electric field or a magnetic field. Therefore, when a digital signal (a Non Return to Zero signal: an NRZ signal) passes through the first coupler 31 and the coupler 131, which are electromagnetically coupled to each other, the received data received by the first coupler 31 is a pulse signal having a small amplitude. The receiver 22 restores the received data received from the first coupler 31 by using a hysteresis comparator or the like. Further, a received-data change detector 24 is connected to a node between the receiver 22 and the buffer 23 in the receiving path 20.

The transmission-data change detector 14 detects a change in the transmission data transmitted from the transmitting-side input switch 11 to the buffer 12. Specifically, the transmission-data change detector 14 generates a detection signal T[N] by detecting a change in the voltage of the transmitting path 10. When the transmission-data change detector 14 detects a change in the transmission data, the communication circuit 1 becomes a transmitting state. In other words, the transmission-data change detector 14 can detect whether or not the communication circuit 1 is in a transmitting state.

The transmission-data change detector 14 outputs the detection signal T[N] to the transmitting-side input switch 11 and the receiving-side output switch 25. The detection signal T[N] output from the transmission-data change detector 14 includes N detection signals T1, T2, ... TN. N is an integer equal to or greater than two. Each of the detection signals T1, T2, ... TN is a pulse signal, and has an H-level (1) or an L-level (0). That is, the detection signal T[N] is an N-bit signal. The pulse widths of the detection signals T1, T2, ... TN are different from one another.

The receiving-side input switch 21 and the transmitting-side output switch 15 are turned on and off according to the detection signal output from the transmission-data change detector 14. That is, the detection signal T[N] output from the transmission-data change detector 14 serves as a control signal for controlling the On/Off of the receiving-side input switch 21 and the transmitting-side output switch 15. More specifically, when the detection signals T1, T2, . . . TN are all at H-levels, the transmitting-side output switch 15 is turned on. Further, when the detection signals T1, T2, . . . TN are all at L-levels, the transmitting-side output switch 15 is turned off. When the detection signal TN is at an L-level, the receiving-side input switch 21 is turned on, whereas when the detection signal TN is at an H-level, the receiving-side input switch 21 is turned off.

The received-data change detector 24 detects a change in the received data output from the receiver 22. Specifically, the received-data change detector 24 generates a detection signal R[1] by detecting a change in the voltage of the receiving path 20. When the received-data change detector 24 detects a change in the received data, the communication circuit 1 becomes a receiving state. In other words, the received-data change detector 24 can detect whether or not the communication circuit 1 is in a receiving state.

The received-data change detector 24 outputs the detection signal R[1] to the transmitting-side input switch 11 and the receiving-side output switch 25. The received-data change detector 24 generates a 1-bit detection signal R[1]. The detection signal R[1] is a pulse signal, and has an H-level or an L-level.

The transmitting-side input switch 11 and the receiving-side output switch 25 are turned on and off according to the detection signal R[1] output from the received-data change detector 24. That is, the detection signal R[1] output from the received-data change detector 24 serves as a control signal for controlling the On/Off of the transmitting-side input switch 11 and the receiving-side output switch 25. More specifically, when the detection signal R[1] is at an H-level, the receiving-side output switch 25 is turned on, whereas when the detection signal R[1] is at an L-level, the receiving-side output switch 25 is turned off. When the detection signal R[1] is at an L-level, the transmitting-side input switch 11 is turned on, whereas when the detection signal R[1] is at an H-level, the transmitting-side input switch 11 is turned off.

The transmitting-side input switch 11, the transmitting-side output switch 15, the receiving-side input switch 21, and the receiving-side output switch 25 operate in order to perform half-duplex communication. The state of the communication circuit 1 is changed to a receiving state, a transmitting state, or a standby state according to the detection signal R[1] and the detection signal T[N]. The receiving state is a state in which the communication circuit 1 is receiving reception data from the communication circuit 100. That is, the receiving state is a state in which the received-data change detector 24 detects a change in the received data. The transmitting state is a state in which the communication circuit 1 is transmitting transmission data to the communication circuit 100. The transmitting state is a state in which the transmission-data change detector 14 detects a change in the transmission data. The standby state is a state in which communication circuit 1 is neither transmitting transmission data nor receiving reception data. That is, the standby state is a state in which neither the transmission-data change detector 14 nor the received-data change detector 24 detects any data change.

When the transmitting-side input switch 11 and the transmitting-side output switch 15 are turned on, the transmitting path 10 becomes a conductive state. Therefore, the communication circuit 1 becomes a transmitting state, and transmission data is transmitted from the first port 32 to the first coupler 31. When the communication circuit 1 is not in the transmitting state, at least the transmitting-side output switch 15 is turned off and hence the transmitting path 10 is disconnected.

When the receiving-side input switch 21 and the receiving-side output switch 25 are turned on, the transmitting path 10 becomes conductive. Therefore, the communication circuit 1 becomes a receiving state, and transmission data is transmitted from the first coupler 31 to the first port 32. When the communication circuit 1 is not in the receiving state, at least the receiving-side output switch 25 is turned off and hence the receiving path 20 is disconnected.

Switching among the transmitting state, the receiving state, and the standby state will be described hereinafter in detail. In the standby state in which no data is transmitted, the detection signals T1, T2, . . . TN, and the detection signal R[1] are all at L-levels. Therefore, the transmitting-side input switch 11 and the receiving-side input switch 21 are in On-states, and the transmitting-side output switch 15 and the receiving-side output switch 25 are in Off-states. That is, the two switches on the input side are turned on and the two switches on the output side are turned off. Therefore, the first coupler 31 and the first port 32 are disconnected from each other in both the transmitting path 10 and the receiving path 20.

Next, a switching operation between a standby state and a transmitting state will be described. In order to transmit transmission data from the communication circuit 1 to the communication circuit 100, a new digital signal is transmitted to the first port 32. When the new digital signal is input from the first port 32, the transmission-data change detector 14 detects a change in the transmission data (see the PORT 1 in FIG. 2). Then, the transmission-data change detector 14 brings all the N detection signals T1, T2, . . . TN into H-levels. The N detection signals T1, T2, . . . TN simultaneously become the H-levels, but eventually return to L-levels as time passes. As shown in FIG. 2, the lengths of the times during which the N detection signals T1, T2, . . . TN are at H-levels are different from one another. Note that the relation among the pulse widths of the detection signals T1, T2, . . . TN is expresses as $t1<t2< . . . <tN$. Therefore, the detection signals return from the H-levels to the L-levels in the order of the detection signal T1, the detection signal T2, . . . , and the detection signal TN.

The detection signal TN is input to the receiving-side input switch 21. When the detection signal TN becomes an H-level, the receiving-side input switch 21 is turned off. The detection signals T1, T2, . . . TN are input to the transmitting-side output switch 15. When the detection signals T1, T2, . . . TN become H-levels, the transmitting-side output switch 15 is turned on. Further, the impedance of the transmitting-side output switch 15 increases as time passes, and the transmitting-side output switch 15 is eventually turned off.

Specifically, every time one of the detection signals T1, T2, . . . TN returns to an L-level one after another, the impedance of the transmitting-side output switch 15 increases in a stepwise manner. For example, when the detection signal T1 becomes an L-level, the impedance is increased by one step, and when the detection signal T2 becomes an L-level, the impedance is further increased by one step. In this manner, every time one of the detection signals T1, T2, . . . TN returns to an L-level, the impedance changes to Z1, to Z2, . . . , and to ZN. Note that the relation among the impedances is expressed as $Z1<Z2< . . . <ZN$. The impedance Z1 is low enough so that the transmitting-side output switch 15 can be considered to be in an On-state. The impedance ZN is high enough so that the transmitting-side output switch 15 can be considered to be in an Off-state. As described above, the impedance gradually increases until the detection signal TN becomes an L-level. Then, when the detection signal TN becomes an L-level, the transmitting-side output switch 15 is turned off.

As a result, when the transmission-data change detector 14 detects a change in the transmission data the transmitting-side output switch 15 is turned on and the receiving-side input switch 21 is turned off and they remain the on-state and the Off-state, respectively during the time t1 after the detection. Therefore, the transmission data input from the first port 32 is output to the first coupler 31 through the transmitting path 10. Then, the communication circuit 1 transmits the transmission data to the communication circuit 100 by using the electromagnetic coupling between the first coupler 31 and the coupler 131. In the transmitting state, the transmitting-side input switch 11 and the transmitting-side output switch 15 are in On-states, and the receiving-side input switch 21 and the receiving-side output switch 25 are in Off-states. In the transmitting state, since the receiving-side input switch 21 is in the Off-state, no transmission data is input to the receiver 22.

If a digital signal having a different value is newly input to the first port 32 within the time t1, the transmission-data change detector 14 detects a change in the transmission data again. That is, when different digital signals ("1" and "0") are successively input to the first port 32, the transmission-data change detector 14 detects a change in the transmission data. As a result, the transmission-data change detector 14 newly generates a detection signal T[N]. Then, since the above-described processes are repeated, the transmission of transmission data is continued. That is, the communication circuit 1 transmits the newly input digital signal to the communication circuit 100 as transmission data. In other words, the transmitting state continues until no new digital signal is input to the first port 32 any longer.

When no new digital signal is input to the first port 32 any longer, the transmitting-side output switch 15 is gradually turned off. The first coupler 31 is terminated at a termination potential. Therefore, as the impedance between the output side of the transmitter 13 and the first coupler 31 increases, the potential of the first coupler 31 converges to the terminal potential. Then, when no new digital signal is input to the first port 32 any longer for the time tN or longer, the transmitting-side output switch 15 is turned off. As a result, the first coupler 31 and the transmitter 13 are disconnected from each other.

Further, when no new digital signal is input to the first port 32 any longer for the time tN or longer, the detection signal TN becomes an L-level. Since the detection signal TN becomes the L-level, the receiving-side input switch 21 is turned on. In this way, the communication circuit 1 returns to the standby state.

As described above, since the impedance of the transmitting-side output switch 15 is gradually increased, the potential of the first coupler 31 slowly converges to the terminal potential. Since the change in the potential of the first coupler 31 is sufficiently slow, no change is detected in the receiver of the communication circuit 100. In other words, the output side of the transmitter 13 is disconnected from the first coupler 31 so that no change in the output of the transmitter 13 is detected by the receiver of the communication circuit 100. Therefore, it is possible to prevent the communication circuit 100 from mistakenly detecting a digital signal, and thereby to prevent the receiver of the communication circuit 100 from mistakenly restoring a digital signal. Further, it is possible to increase the impedance of the transmitting-side output switch 15 in a stepwise manner by using N detection signals T1, T2, . . . TN (N is an integer equal to or greater than two). Therefore, it is possible to prevent a malfunction by using a simple configuration.

The time during which the transmitting-side output switch 15 remains in the off-sate can be sufficiently longer than the temporal change of the voltage of data communication. For example, the transmitting-side output switch 15 can be slowly turned off over a time equal to or longer than 10 times the signal transition time (the rise time or the fall time) of a digital signal transmitted in data communication. For example, the signal transition time of a digital signal transmitted in data communication is 0.1 nsec to 1 nsec. The time over which the impedance of the transmitting-side output switch 15 is slowly increased can be 1 nsec to 10 nsec or longer.

Next, a switching operation between a standby state and a receiving state will be described. A digital signal transmitted from the communication circuit 100 becomes a pulse signal having a small amplitude after passing through the first coupler 31. Then, the pulse signal is input to the receiver 22 through the receiving-side input switch 21. The receiver 22 restores the pulse signal having the small amplitude to a digital signal by using, for example, a hysteresis comparator.

Then, the receiver 22 outputs the restored digital signal as received data. When the received-data change detector 24 detects a change in the received data, it brings the detection signal R[1] into an H-level. By the detection signal R[1], the transmitting-side input switch 11 is turned off and the receiving-side output switch 25 is turned on. Therefore, the received data is transmitted to the first port 32 through the receiving path 20.

The time during which the detection signal R[1] remains at the H-level after the received-data change detector 24 detects a change in the received data is referred to as a time tR. The time tR may be, for example, roughly equal to the time tN. When the received-data change detector 24 detects a change in the received data, the transmitting-side input switch 11 is turned off and the receiving-side output switch 25 is turned on, and they remain in the Off-state and the On-state, respectively, during the time tR after the detection.

When a next received data is received through the first coupler 31 within the time tR, the received-data change detector 24 detects a change in the received data again. As a result, the received-data change detector 24 newly generates a detection signal R[1]. Then, since the above-described processes are repeated, the reception of reception data is continued. That is, the communication circuit 1 transmits the newly received digital signal to the communication circuit 100 as received data. In other words, the receiving state continues until no new signal is received from the first coupler 31 any longer.

When no new reception data is received any longer for the time tR or longer, the detection signal R[1] becomes an L-level. By the detection signal R[1], the transmitting-side input switch 11 is turned on and the receiving-side output switch 25 is turned off. As a result, the first port 32 and the receiver 23 are disconnected from each other, and the communication circuit 1 returns to the standby state.

In summary, in the transmitting state, the receiving state, and the standby state, the communication circuit 1 operates as described below.

When the received-data change detector 24 detects a change in the received data, the communication circuit 1 becomes a receiving state. In the receiving state, the first port 32 is connected to the first coupler 31 through the receiving path 20, and the transmitter 13 is disconnected from the first port 32 and the first coupler 31 in the transmitting path 10. Note that, in the receiving state, since the transmitting-side input switch 11 is in the Off-state, the transmission-data change detector 14 detects no change in the transmission data. Therefore, the receiving-side input switch 21 is kept in the On-state and the transmitting-side output switch 15 is kept in the Off-state. Any received data that is output from the receiver 22 is not input to the receiver 22 through the transmitter 13 again.

When the transmission-data change detector 14 detects a change in the transmission data, the communication circuit 1 becomes a transmitting state. In the transmitting state, the first port 32 is connected to the first coupler 31 through the transmitting path 10, and the first port 32 is disconnected from the first coupler 31 in the receiving path 20. Note that, in the transmitting state, since the receiving-side input switch 21 is in the Off-state, the received-data change detector 24 detects no change in the received data. Therefore, the transmitting-side input switch 11 is in the On-state, and the receiving-side output switch 25 is kept in the Off-state. Any transmission data output from the transmitter 13 is not input to receiver 22.

When neither of the received-data change detector 24 and the transmission-data change detector 14 detects a change in the received data or the transmission data, the communication circuit 1 becomes a standby state. In the standby state, the input side of the receiver 22 is connected to the first coupler 31 and the output side of the receiver 22 is disconnected from the first port 32 in the receiving path 20. In addition, the input side of the transmitter 13 is connected to the first port 32 and the output side of the transmitter 13 is disconnected from the first coupler 31 in the transmitting path 10. That is, in the standby state, both the transmission-data change detector 14 and the received-data change detector 24 stand ready in a state in which they can detect a change in the data. In this way, the communication circuit 1 can quickly change its state from the standby state to a transmitting state or a receiving state.

In this manner, it is possible to transmit and receive data between the two communication circuits by performing half-duplex communication. It is possible to perform half-duplex communication without using a timing signal for switching between a transmitting state and a receiving state.

The communication circuit 1 and the communication circuit 100 may be applied to non-contact connectors of various interfaces. That is, the communication circuit 1 may be mounted on a non-contact connector for transmitting data output from an electronic apparatus to another electronic apparatus. Further, the communication circuit 100 may be mounted on a non-contact connector of an electronic apparatus which is an entity with which the communication circuit 1 communicates. Data is input to or output from an electronic apparatus in which the non-contact connector is used through the first port 32. Therefore, it is possible to improve the connection performance of the electronic apparatus. It is possible to perform mutual authentication between the apparatuses in which the communication circuits 1 and 100 are mounted, respectively, or to exchange a key for restoring encrypted data or scrambled video data between these apparatuses. There is no need to generate and transmit a timing signal that indicates whether the communication circuit is in a transmitting state or a receiving state between the connectors. Therefore, it is possible to reduce the sizes of the connectors and simplify the configurations thereof.

Note that each of the transmitting-side input switch 11 and the receiving-side output switch 25 can include a keeper that holds, when it is in an Off-state, the potential of an entity to which a signal is transmitted. That is, the transmitting-side input switch 11 can include a keeper on the side on which it is connected to the transmission-data change detector 14. The receiving-side output switch 25 can include a keeper on the first port 32 side.

Further, a buffer 12 can be provided between the transmitting-side input switch 11 and the transmitter 13. It is possible, by providing the buffer 12, to delay the transmission of a digital signal to the transmitter 13 by an amount of time equivalent to the time that the transmission-data change detector 14 requires to detect a change in the digital signal.

Similarly, a buffer 23 can be provided between the receiver 22 and the receiving-side output switch 25. It is possible, by providing the buffer 23, to delay the transmission of a digital signal to the receiving-side output switch 25 by an amount of time equivalent to the time that the received-data change detector 24 requires to detect a change in the digital signal.

The communication circuit 100 according to this embodiment is not limited to the single-end transmission configuration, and can also be applied to a differential signal transmission configuration in which signals can be transmitted at a high speed. In such a case, the transmitting path 10 includes two signal lines and the receiving path 20 includes two lines.

In the transmitting path 10, the transmitting-side input switch 11 serves as a transmitting-side input switching circuit TI, and connects or disconnects the path between the first port 32 and the transmitter 13. In the transmitting path 10, the transmitting-side output switch 15 serves as a transmitting-side output switching circuit TO, and connects or disconnects the path between the transmitter 13 and the first port 32.

In the receiving path 20, the receiving-side output switch 25 serves as a receiving-side output switching circuit RO, and connects or disconnects the path between the receiver 22 and the first port 32. In the receiving path 20, the receiving-side input switch 21 serves as a receiving-side input switching circuit RI, and connects or disconnects the path between the first coupler 31 and the receiving-side output switch 25.

Further, in the case in which the amplitude of a digital signal on the first port 32 side is small, a circuit that converts a small amplitude to a large amplitude can be added on the output side of the transmitting-side input switch 11, and a circuit that converts a large amplitude to a small amplitude can be added on the input side of the receiving-side output switch 25.

Second Embodiment

Figure 3:
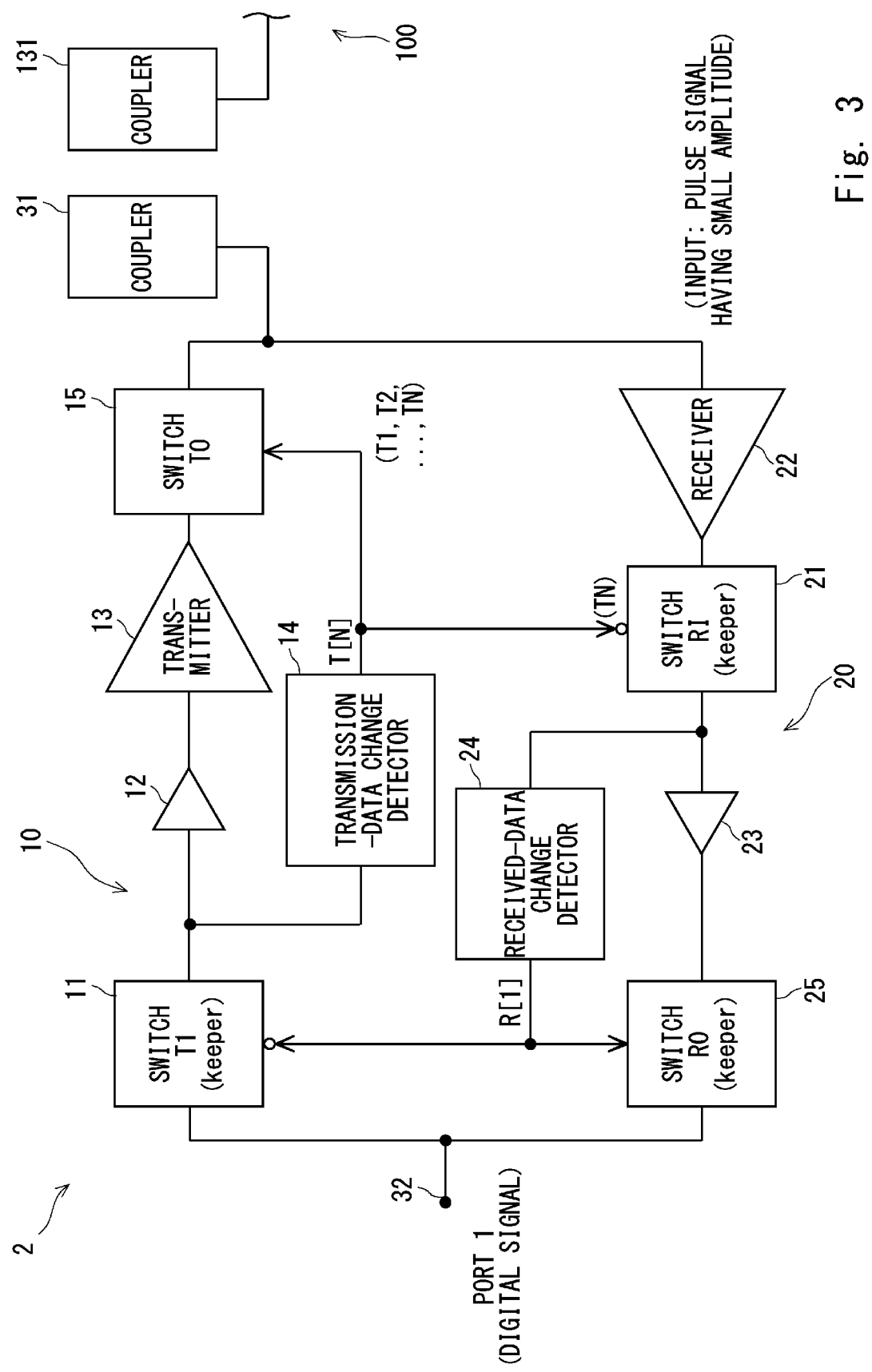
FIG. 3 is a block diagram showing a configuration of a communication circuit according to a second embodiment.

A communication circuit according to a second embodiment will be described with reference to FIG. 3. FIG. 3 is a block diagram showing a configuration of a communication circuit 2 according to this embodiment. In the communication circuit 2, the positions of the receiving-side input switch 21 and the receiver 22 are exchanged as compared to the configuration of the communication circuit 1 shown in the first embodiment. The fundamental configuration and operations of the communication circuit 2 other than those of the receiving-side input switch 21 and the receiver 22 are similar to those of the first embodiment, and therefore descriptions thereof will be omitted.

The received-data change detector 24 is connected to a node between the receiving-side input switch 21 and the buffer 23. The receiving-side input switch 21 includes a keeper that holds, when it is in an Off-state, the potential of an entity to which a signal is transmitted. The receiving-side input switch 21 includes a keeper on the buffer 23 side. In the receiving path 20, the receiving-side input switch 21 serves as a receiving-side input switching circuit RI, and connects or disconnects the path between the first coupler 31 and the receiving-side output switch 25.

In the first embodiment, it is necessary to set the input bias of the receiver 22. In contrast, in the second embodiment, the input of the receiver 22 is biased to the terminal potential of the first coupler 31. Therefore, there is no need to set the bias of the receiver 22. Therefore, the circuit configuration can be simplified even further.

Further, in the second embodiment, a pulse signal having a small amplitude output from the first coupler 31 is input to the receiver 22 without passing through the receiving-side input switch 21. Therefore, it is possible to prevent the pulse signal having the small amplitude input to the receiver 22 from, for example, being attenuated by the receiving-side input switch 21.

Third Embodiment

Figure 4:
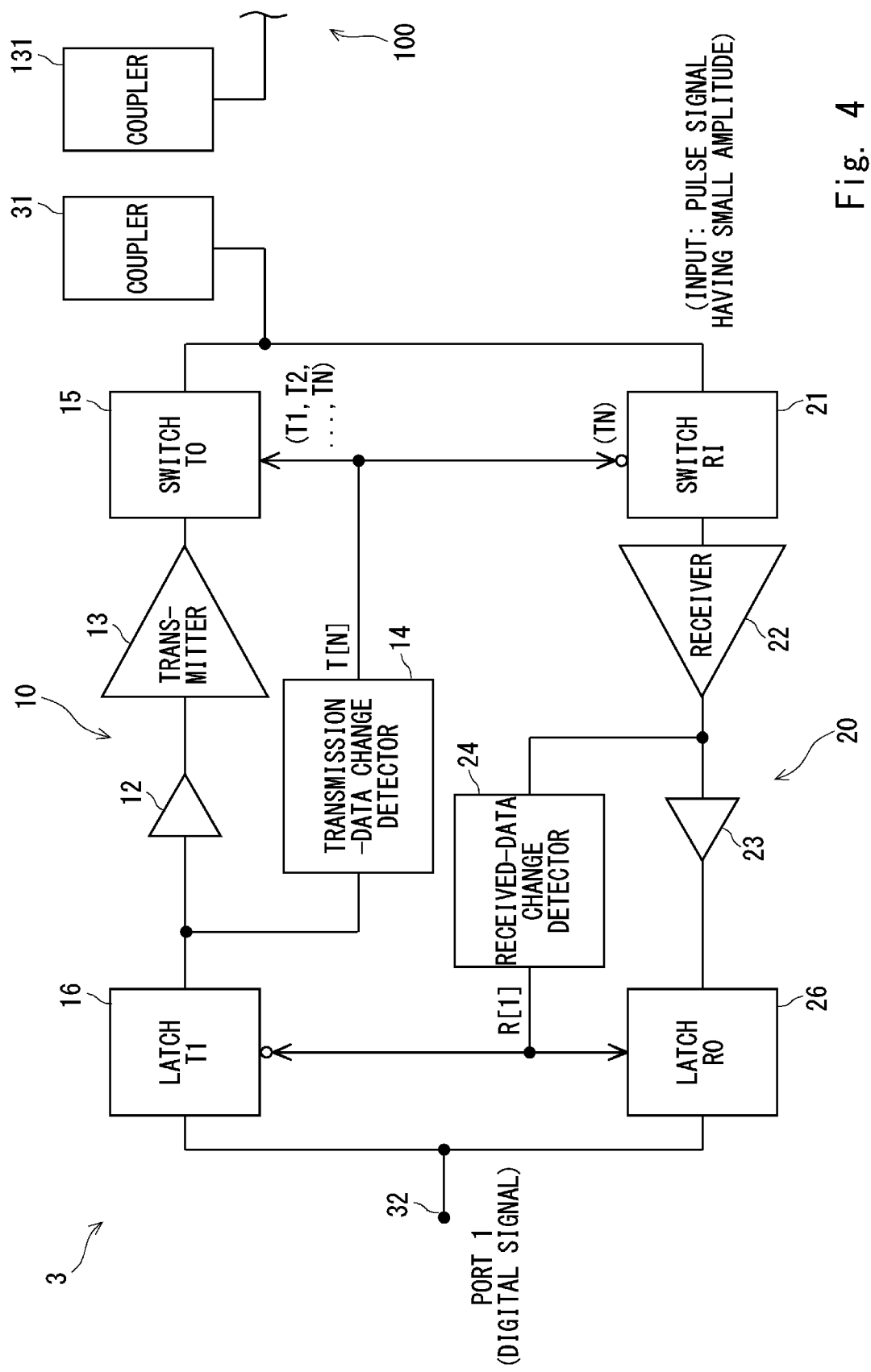
FIG. 4 is a block diagram showing a configuration of a communication circuit according to a third embodiment.

A communication circuit 3 according to a third embodiment will be described with reference to FIG. 4. FIG. 4 is a block diagram showing a configuration of the communication circuit 3 according to this embodiment. In the communication circuit 3, the transmitting-side input switch 11 in the first embodiment is replaced by a latch 16, and the receiving-side output switch 25 is replaced by a latch 26. Note that the fundamental configuration and operations of the communication circuit 3 other than those of the latches 16 and 26 are similar to those of the first embodiment, and therefore descriptions thereof will be omitted.

The latch 16 has the function similar to that of the transmitting-side input switch 11 with a keeper. The latch 26 has the function similar to that of the receiving-side output switch 25 with a keeper. Therefore, the same advantageous effects as those in the first embodiment can be achieved. Note that only one of the transmitting-side input switch 11 and the receiving-side output switch 25 may be replaced by the latch 16 or 26.

In the transmit path 10, the latch 16 serves as the transmitting-side input switching circuit TI, and connects or disconnects the path between the first coupler 31 and the transmitter 13. In the receiving path 20, the latch 26 serves as the receiving-side output switching circuit RO, and connects or disconnects the path between the receiver 22 and the first port 32.

Figure 5:
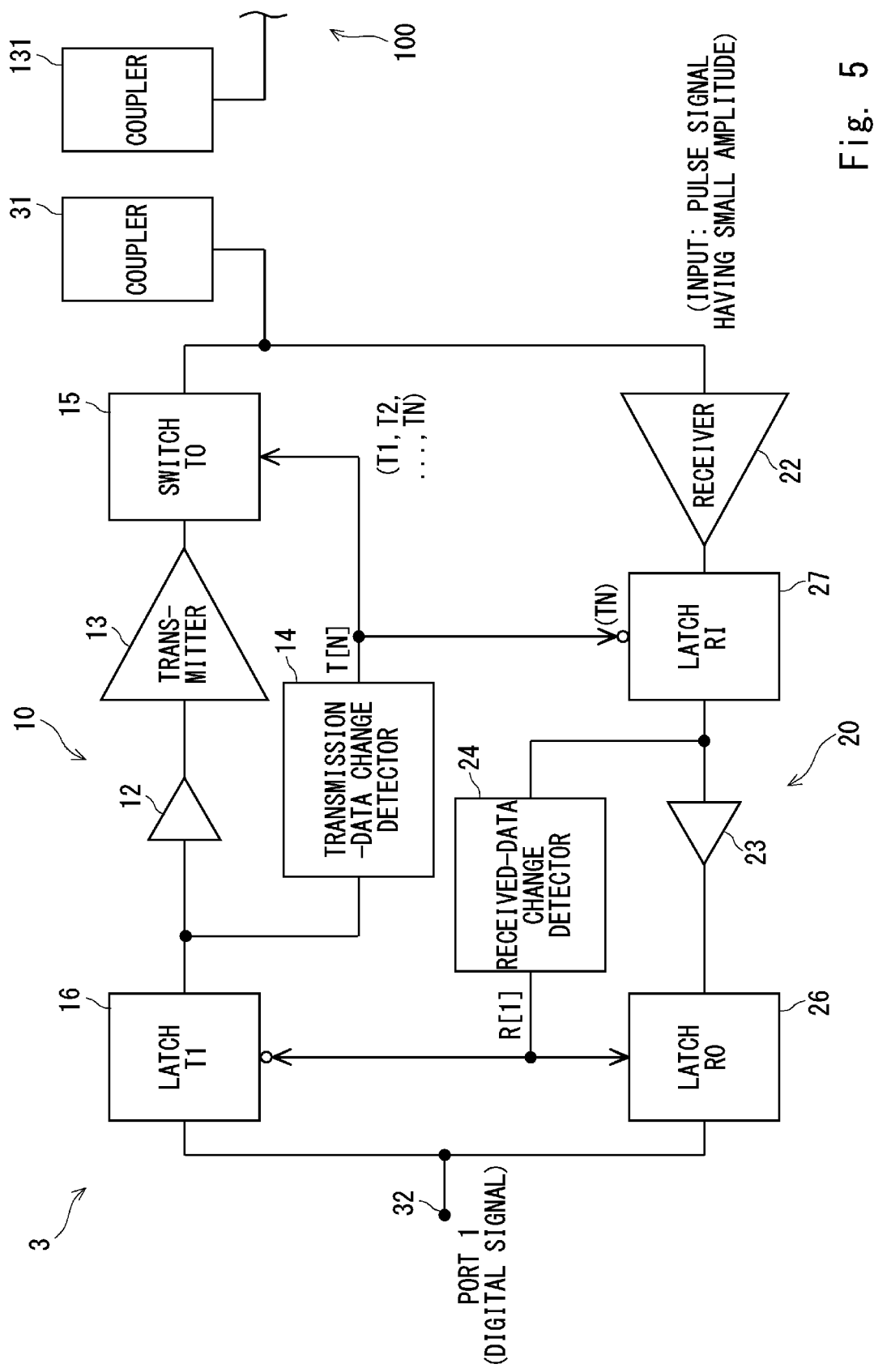
FIG. 5 is a block diagram showing a configuration of a communication circuit according to another version of the third embodiment.

In the communication circuit 2 according to the second embodiment, the transmitting-side input switch 15 and the receiving-side output switch 25 may be replaced by the latches 16 and 26. In such a case, its configuration becomes one shown in FIG. 5. Further, in this configuration, the receiving-side input switch 21 may be replaced by a latch 27 as shown in FIG. 5. In the receiving path 20, the latch 27 serves as the receiving-side input switching circuit RI, and connects or disconnects the path between the first coupler 31 and the receiving-side output switch 25.

Note that at least one of the transmitting-side output switch 15, the receiving-side output switch 25, and the receiving-side input switch 21 may be replaced by the latch 16, 26 or 27. In this configuration, the same advantageous effects as those in the first and second embodiments can be obtained.

Fourth Embodiment

Figure 6:
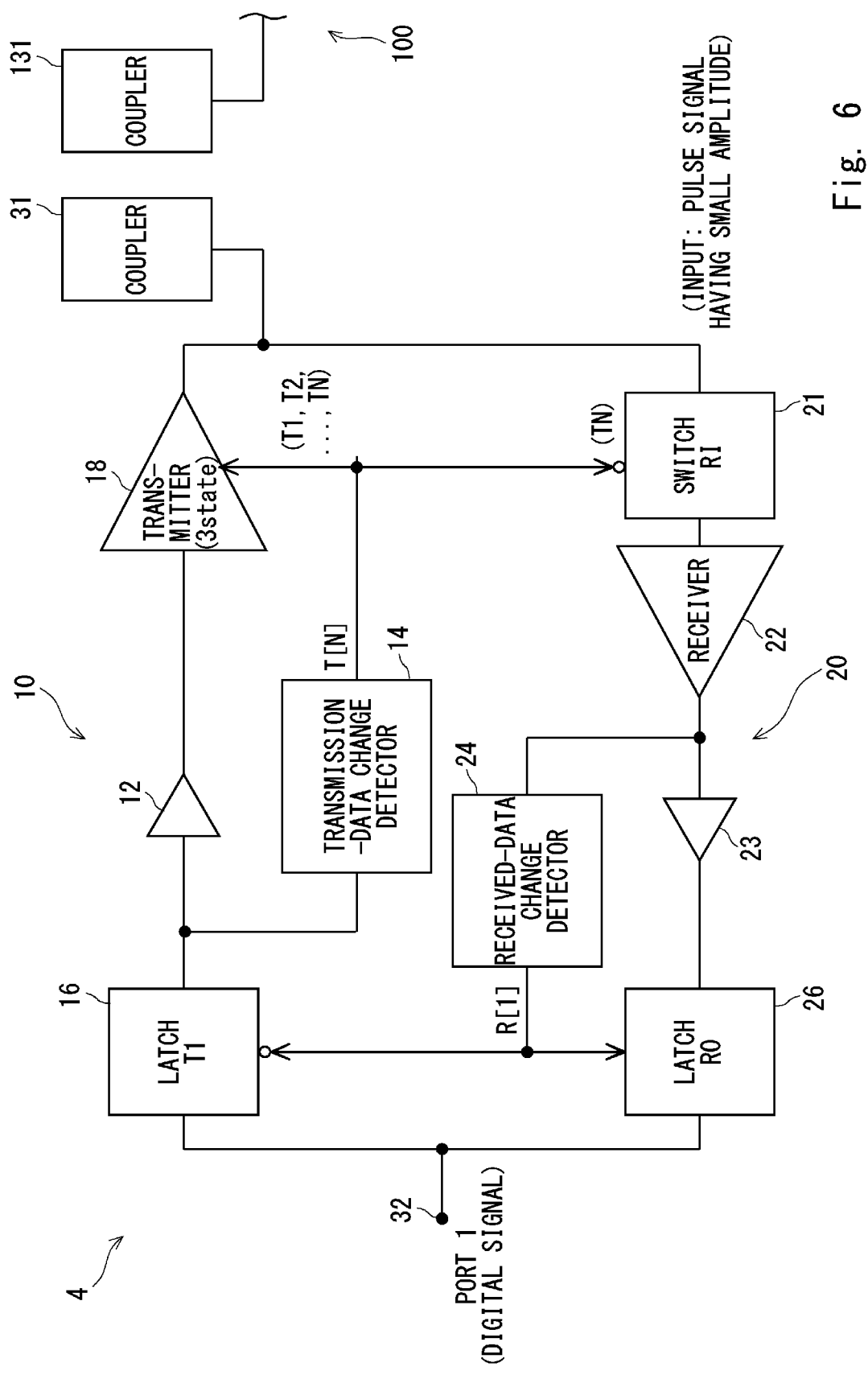
FIG. 6 is a block diagram showing a configuration of a communication circuit according to a fourth embodiment.

A communication circuit according to a fourth embodiment will be described with reference to FIG. 6. FIG. 6 is a block diagram showing a configuration of a communication circuit 4. In the communication circuit 4, a three-state transmitter 18 is provided in place of the transmitter 13 and the transmitting-side output switch 15 of the communication circuit 3 shown in FIG. 4. The three-state transmitter 18 can output three states, i.e., an H-level (1), an L-level (0), and a High-Z (a high impedance).

The detection signals T1, T2, . . . TN serve as control signals for switching the state of the three-state transmitter 18 to an enabled state or a disabled state. When the detection signals T1, T2, . . . TN are at H-levels, the three-state transmitter 18 is enabled and kept in the enabled state for a fixed time, and transmits data during the fixed time. That is, when the three-state transmitter 18 becomes the enabled state, the three-state transmitter 18 outputs an H-level or an L-level. When the detection signals T1, T2, . . . TN are at L-levels, the three-state transmitter 18 becomes a disabled state and outputs a high-Z.

Further, it is possible to make the three-state transmitter 18 output a High-Z in a manner similar to the output operation performed in the first embodiment. That is, when the state of the communication circuit changes from a transmitting state to a standby state, the state of the three-state transmitter 18 slowly changes from an enabled state to a disabled state. The impedance between the output side of the three-state transmitter 18 and the first coupler 31 increases. The transmitting-side output switch 15 shown in the first embodiment can be made unnecessary. By the configuration shown in FIG. 6, the same advantageous effects as those in the first embodiment can be achieved. Needless to say, the three-state transmitter 18 may also be used in the communication circuits 2 and 3 shown in FIGS. 3 to 5.

Fifth Embodiment

Figure 7:
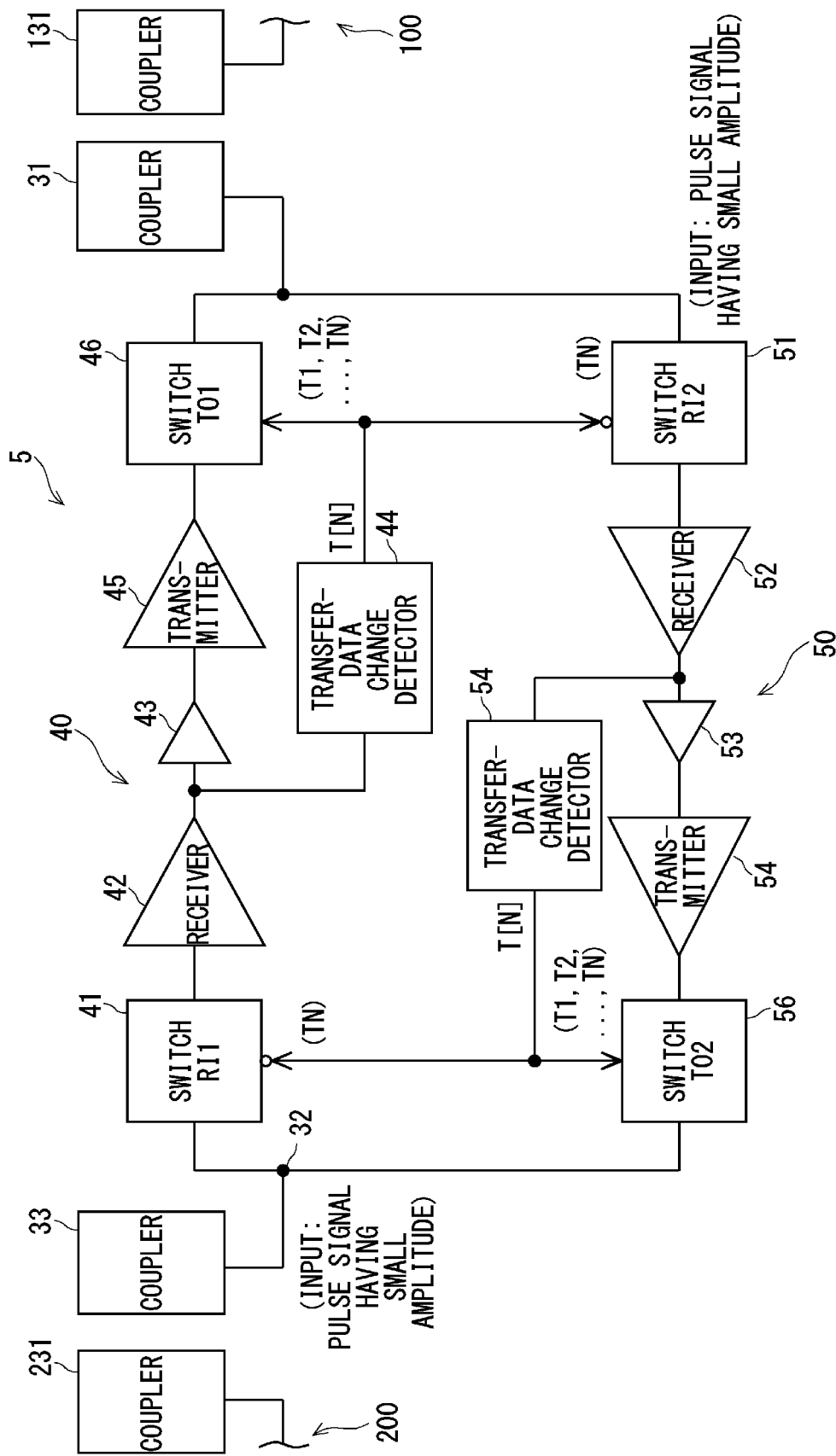
FIG. 7 is a block diagram showing a configuration of a communication circuit according to a fifth embodiment.

A communication circuit 5 according to a fifth embodiment will be described with reference to FIG. 7. FIG. 7 is a block diagram showing a configuration of the communication circuit 5. The communication circuit 5 is used as a repeater that relays data between a communication circuit 100 and a communication circuit 200. That is, the communication circuit 5 receives transmission data from the communication circuit 100 and transmits the received transmission data to the communication circuit 200. Alternatively, the communication circuit 5 receives transmission data from the communication circuit 200 and transmits the received transmission data to the communication circuit 100. Note that descriptions of parts of the configuration similar to those of the first to fourth embodiments will be simplified as appropriate.

The communication circuit 5 includes a second coupler 33 that is coupled to a coupler 231 of the communication circuit 200. The second coupler 33 is connected to the first port 32. The second coupler 33 is an electromagnetic coupler similar to the first coupler 31.

Note that, in this embodiment, a path that is used to relay data that is transmitted from the communication circuit 200 to the communication circuit 100 is referred to as a first relay path 40. A path that is used to relay data that is transmitted from the communication circuit 100 to the communication circuit 200 is referred to as a second relay path 50. The first relay path 40 is a path through which data is transmitted from the first port 32 to the first coupler 31, and corresponds to the transmitting path 10 in the first to fourth embodiments when the data is transmitted to the communication circuit 100. The second relay path 50 is a path through which data is transmitted from the first coupler 31 to the first port 32, and corresponds to the transmitting path 20 in the first to fourth embodiments when the data is received from the communication circuit 100.

In the first relay path 40, as enumerated from the first port 32 side, a first input switch 41, a receiver 42, a buffer 43, a transmitter 45, and a first output switch 46 are provided. Further, a first transfer data change detector 44 is connected to a node between the receiver 42 and the buffer 43.

The first input switch 41, the buffer 43, the transmitter 45, and the first output switch 46 correspond to the transmitting-side input switch 11, the buffer 12, the transmitter 13, and the transmitting-side output switch 15, respectively, shown in the first embodiment. In other words, in addition to the components in the transmitting path 10 shown in the first embodiment, the receiver 42 is added in the first relay path 40. The receiver 42 operates in a manner similar to the receiver 22. That is, the receiver 42 restores a pulse signal having a small amplitude received through the second coupler 33.

In the second relay path 50, as enumerated from the first coupler 31 side, a second input switch 51, a receiver 52, a buffer 53, a transmitter 55, and a second output switch 56 are provided. Further, a second transfer data change detector 54 is connected to a node between the receiver 42 and the buffer 43.

The second input switch 51, the receiver 52, the buffer 53, and the second output switch 56 correspond to the receiving-side input switch 21, the receiver 22, the buffer 23, and the receiving-side output switch 25, respectively, shown in the first embodiment. In other words, in addition to the components in the receiving path 20 shown in the first embodiment, the transmitter 55 is added in the second relay path 50. The transmitter 55 performs processing such as amplification for the digital signal restored by the receiver 52. That is, the transmitter 55 operates in a manner similar to the transmitter 13.

The first transfer data change detector 44 detects a change in the transfer data transmitted through the first relay path 40. The first transfer data change detector 44 outputs a detection signal TA[N] to the first output switch 46 and the second input switch 51. The second transfer data change detector 54 detects a change in the transfer data transmitted through the second relay path 50. The second transfer data change detector 54 outputs a detection signal TB[N] to the first input switch 41 and the second output switch 56.

As described in the first embodiment, each of the detection signals T[N] output from the first and second transfer data change detectors 44 and 54 includes N detection signals T1, T2, . . . TN. Only the detection signal TN output from the first transfer data change detector 44 is input to the first input switch 41. Only the detection signal TN output from the second transfer data change detector 54 is input to the second input switch 51. Similar to the receiving-side input switch 21 in the first embodiment, the On/Off of each of the first and second input switches 41 and 51 is controlled based on the detection signal TN.

The N detection signals T1, T2, . . . TN output from the first transfer data change detector 44 are input to the first output switch 46. The N detection signals T1, T2, . . . TN output from the second transfer data change detector 54 are input to the second output switch 56. The first and second output switches 46 and 56 operate based on the N detection signals T1, T2, . . . TN. The operations performed by the first and second output switches 46 and 56 are similar to those performed by the transmitting-side output switch 15.

Since the impedances of the first and second output switches 46 and 56 are gradually increased, the potentials of the first and second couplers 31 and 33 slowly converge to the termination potential. Since the changes in the potentials of the first and second couplers 31 and 33 are sufficiently slow, no change is detected in the receivers of the communication circuits 100 and 200. Therefore, it is possible to prevent the communication circuits 100 and 200 from mistakenly detecting a digital signal, and thereby to prevent the receivers of the communication circuits 100 and 200 from mistakenly restoring a digital signal.

In this manner, the communication circuit 5 can relay transmission/reception data between the communication circuits 100 and 200. Note that each of the communication circuits 100 and 200 may be a communication circuit like those shown in the first to fourth embodiments. Each of the communication circuits 100 and 200 may be the communication circuit 5 for a repeater like the one shown in the fifth embodiment. In such a case, it is possible to perform a relaying operation twice or more.

An example of a circuit diagram of each block used in the first to fifth embodiments will be described hereinafter. Each of FIGS. 8 to 18 is a circuit diagram showing an example of such a block.

Received-Data Change Detector

Figure 8:
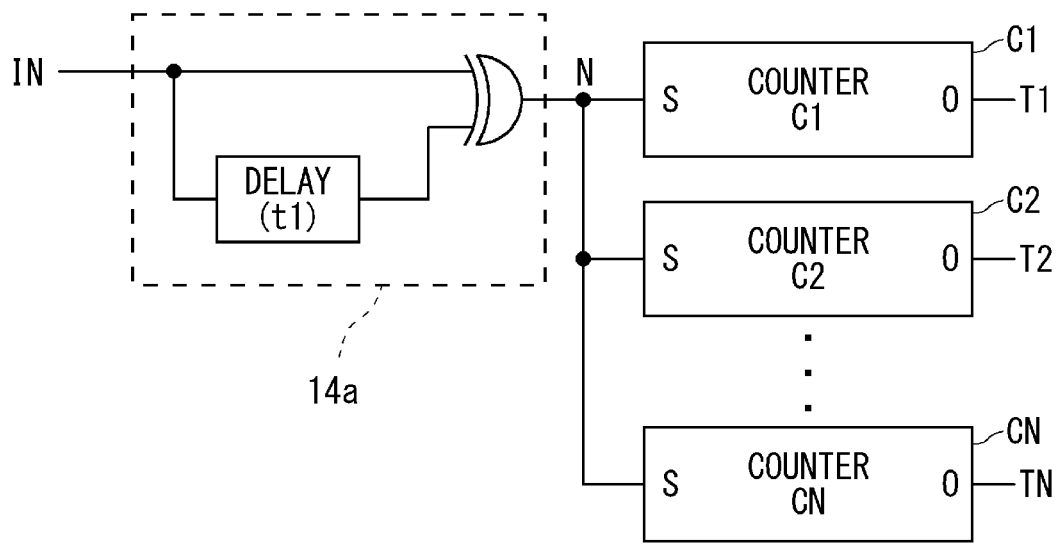
FIG. 8 is a circuit diagram showing a configuration of a transmission-data change detector.
Figure 8:
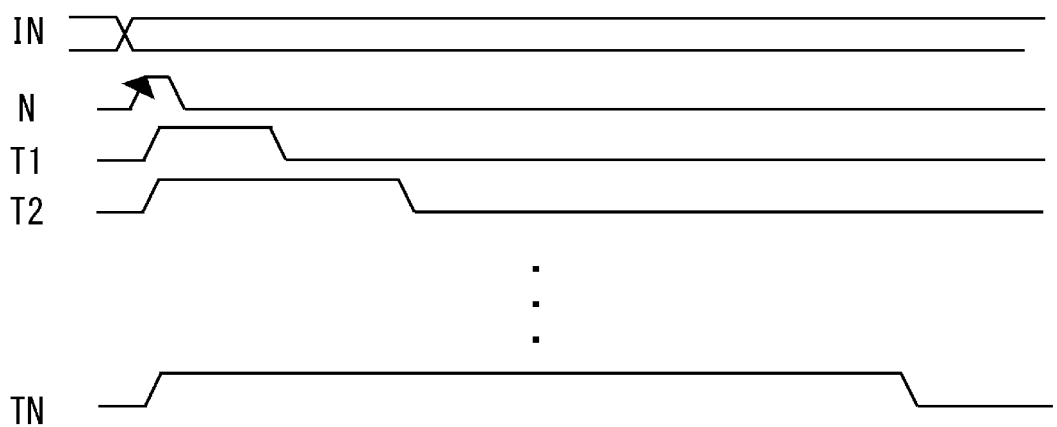

FIG. 8 is a circuit diagram showing a configuration of the transmission-data change detector 14 that outputs N detection signals T1, T2, . . . TN. It includes a signal change detector 14a and N counters C1 to CN. In the first embodiment, the input IN of the transmission-data change detector 14 is transmission data output from the transmitting-side input switch 11.

The signal change detector 14a includes a delay circuit t1 and an XOR circuit. A predetermined delay time is set in the delay circuit. The delay circuit t1 delays the input IN and supplies the delayed input IN to the XOR circuit. The XOR circuit outputs an exclusive disjunction N of the original input IN and the delayed input IN. Therefore, when there is a change in the transmission data, the exclusive disjunction N becomes an H-level. The exclusive disjunction N is input to the counters C1 to CN.

The counters C1 to CN start a counting operation at a timing at which the exclusive disjunction N becomes an H-level based on a clock signal. Then, each of the outputs T1 to TN of the counters C1 to CN becomes an H-level at the start of the counting operation and remains at the H-level until the counted number of clocks (the count number) reaches a predetermined count value for that counter. The output of each of the counters C1 to CN becomes an L-level when the count number reaches the predetermined count value for that counter. The outputs of the counters C1 to CN serve as the detection signals T1 to TN, respectively.

The count values of the counters C1 to CN are different from one another. That is, when the count values of the counters C1, C2, . . . CN are represented by c1, c2, . . . cN, these count values increase in the order of c1, c2, . . . cN. By using the count values of the counters C1 to CN, it is possible to generate N detection signals T1 to TN having desired pulse widths by setting the count numbers of the counters C1 to CN to predetermined values.

Further, when the signal change detector 14a continues detecting changes, the counters C1 to CN start a counting operation again. The configuration shown in FIG. 8 can also be applied to the first and second transfer data change detectors 44 and 54. Note that the receiving-side output switch 25 outputs one detection signal R[1]. Therefore, the number of counters in FIG. 8 may be changed to one.

Receiving-Side Input Switch 21

Figure 9:
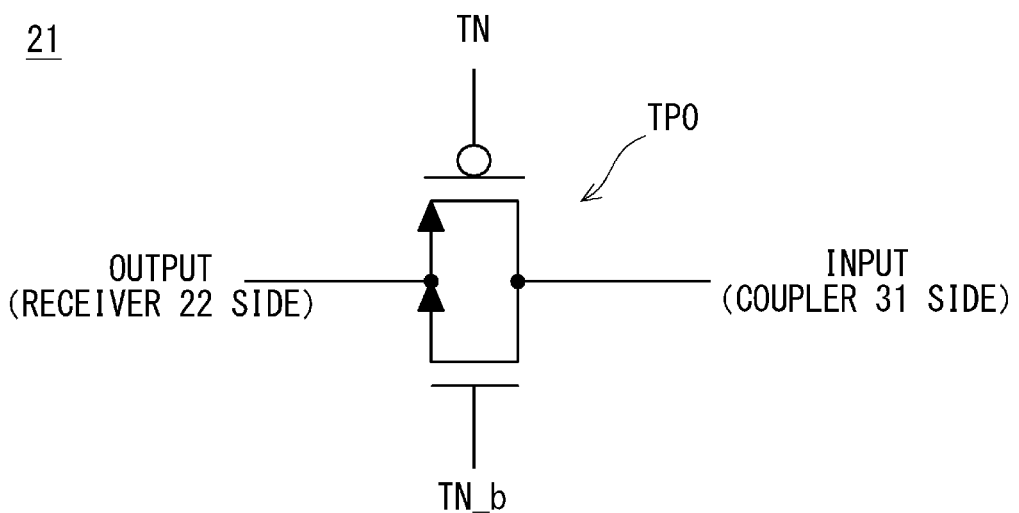
FIG. 9 is a circuit diagram showing a configuration of a receiving-side input switch 21.

FIG. 9 is an example of a circuit diagram of the receiving-side input switch 21 used in the first embodiment. A pair of transistors (hereinafter referred to as a transistor pair) TP0 is disposed between an input (the first coupler 31 side) and an output (the receiver 22 side). The transistor pair TP0 includes a P-channel MOS (Metal Oxide Semiconductor) transistor and an N-channel MOS transistor. The P-channel MOS (hereinafter referred to as PMOS) transistor and the NMOS (hereinafter referred to as NMOS) transistor are connected in parallel between the input and the output. A detection signal TN and its inverted signal TN_b output from the transmission-data change detector 14 are input to the gates of the transistors of the transistor pair TP0.

When the detection signal TN is at an H-level, the NMOS transistor and the PMOS transistor of the transistor pair TP0 are turned off. Therefore, the input side of the receiver 22 is disconnected from the first coupler 31. When the detection signal TN is at an L-level, the NMOS transistor and the PMOS transistor of the transistor pair TP0 are turned on. Therefore, the input side of the receiver 22 is connected to the first coupler 31. In this manner, the state of the path is switched between a connected state and a disconnected state.

Transmitting-Side Output Switch 15

Figure 10:
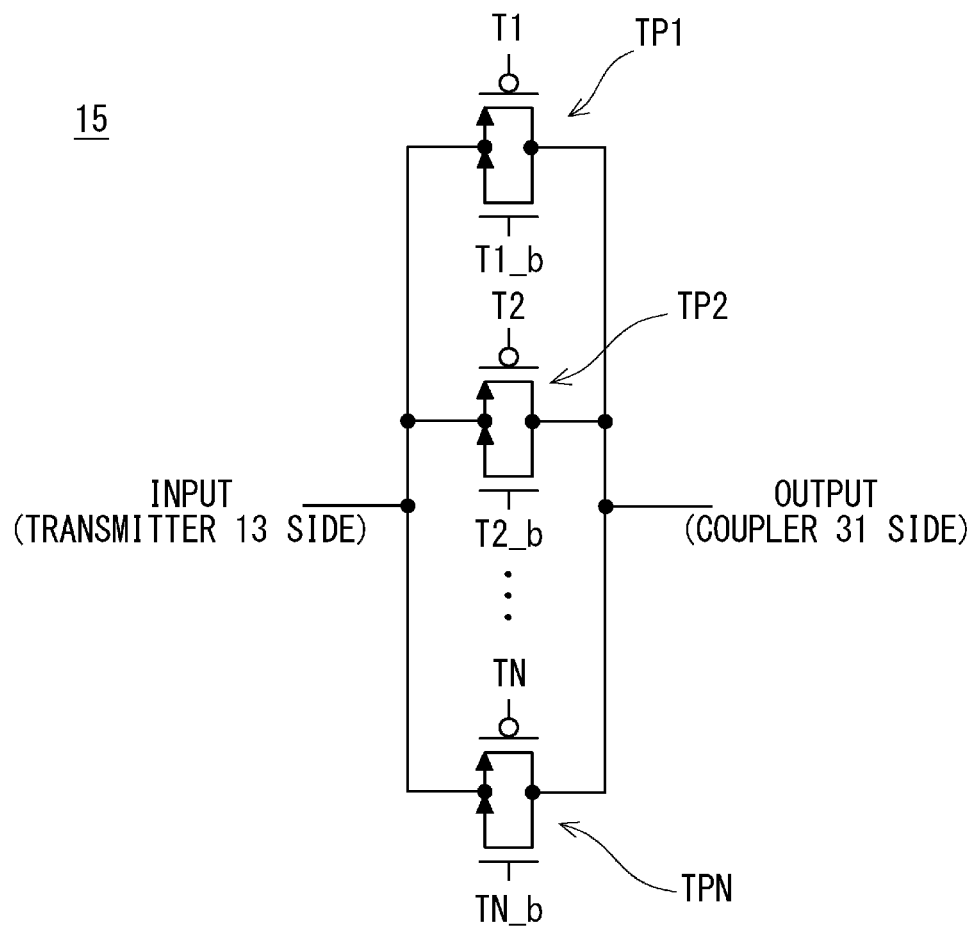
FIG. 10 is a circuit diagram showing a configuration of a transmitting-side output switch 15.

FIG. 10 is a circuit diagram showing a configuration of the transmitting-side output switch 15. N transistor pairs TP1, TP2, . . . TPN are connected in parallel between an input (the transmitter 13 side) and an output (the first coupler 31 side). Similar to the transistor pair TP0 shown in FIG. 9, an NMOS transistor and a PMOS transistor are connected in parallel in each of the transistor pairs TP1, TP2, . . . TPN. A detection signal T1 and its inverted signal T1_b are input to the gates of the transistor pair TP1. Similarly, a detection signal T2 and its inverted signal T2_b are input to the gates of the transistor pair TP2, and a detection signal TN and its inverted signal TN_b are input to the gates of the transistor pair TPN.

Similar to the transistor pair TP0 shown in FIG. 9, the transistor pair TPN is turned off when the detection signal TN is at an H-level, and is turned on when the detection signal TN is at an L-level. Further, when the detection signal T1 is at an L-level, the transistor pair TP1 is turned off, and when the detection signal T1 is at an H-level, the transistor pair TP1 is turned on. Further, when the detection signal T2 is at an L-level, the transistor pair TP2 is turned off, and when the detection signal T2 is at an H-level, the transistor pair TP2 is turned on.

The detection signals T1, T2, . . . TN have waveforms shown in FIG. 2. Therefore, the transistor pairs TP1 to TPN are simultaneously turned on. Then, the transistor pairs TP1, TP2, . . . TPN are turned off one by one. Therefore, it is possible, by setting the on-resistances of the transistors to appropriate values, to appropriately increase the impedance of the transmitting-side output switch 15 when the state of the communication circuit changes from a transmitting state to a standby state.

Note that the circuit configuration shown in FIG. 10 can also be applied to the first and second output switches 46 and 56 in the fifth embodiment.

Transmitting-Side Input Switch 11

Figure 11:
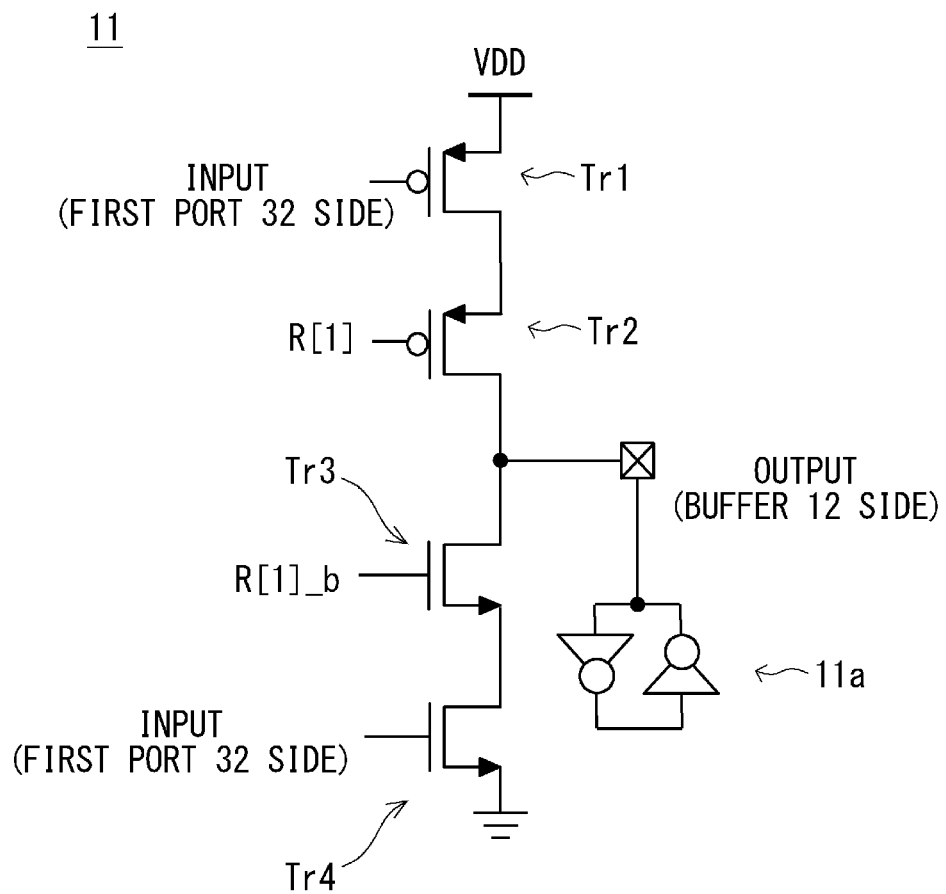
FIG. 11 is a circuit diagram showing a configuration of a transmitting-side input switch 11 with a keeper.

FIG. 11 is a circuit diagram showing a configuration of the transmitting-side input switch 11 with a keeper shown in the first and second embodiments. The transmitting-side input switch 11 includes a keeper 11a and four transistors Tr1, Tr2, Tr3 and Tr4. The transmitting-side input switch 11 is formed by using a CMOS (Complementary Metal Oxide Semiconductor) circuit.

The four transistors Tr1 to Tr4 are connected in series between a power supply potential VDD and a ground potential. The two transistors Tr1 and Tr2 located on the power supply potential VDD side are PMOS transistors, and the two transistors Tr3 and Tr4 located on the ground potential side are NMOS transistors. A node between the transistors Tr2 and Tr3 serves as an output to the buffer 12.

A detection signal R[1] and its inverted signal R[1]_b are input to the gates of the transistors Tr2 and Tr3, respectively. Therefore, when the detection signal R[1] is at an L-level, the transistors Tr2 and Tr3 are turned on, and when the detection signal R[1] is at an H-level, the transistors Tr2 and Tr3 are turned off. In a receiving state, the output to the buffer 12 is disconnected from the power supply potential VDD and the ground potential.

A digital signal input through the first port 32 is input to the gates of the transistors Tr1 and Tr4. The transistors Tr1 and Tr4 constitute a CMOS switch circuit. Therefore, when the detection signal R[1] is at an L-level, the potential of the output to the buffer 12 becomes the power supply potential VDD or the ground potential according to the digital signal.

Further, the keeper 11a is connected to the output to the buffer 12. In the keeper 11a, two inverters are connected in a circular configuration. Therefore, the output potential at the timing at which the detection signal R[1] changes from an L-level to an H-level is held. That is, the potential of the output to the buffer 12 is maintained at the potential at the timing at which the state of the communication circuit changes from a standby state to a receiving state.

Receiving-Side Output Switch 25

Figure 12:
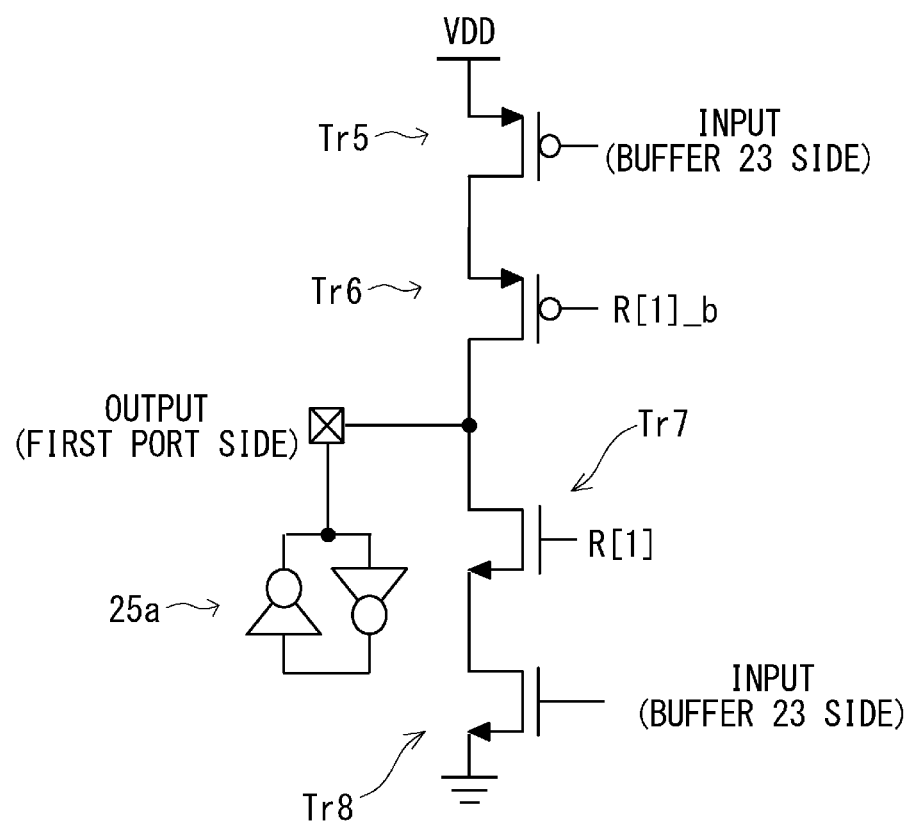
FIG. 12 is a circuit diagram showing a configuration of a receiving-side output switch 25 with a keeper.

FIG. 12 is a circuit diagram showing a configuration of the receiving-side output switch 25 with a keeper shown in the first and second embodiments. The receiving-side output switch 25 includes a keeper 25a and four transistors Tr5, Tr6, Tr7 and Tr8. Similar to the transmitting-side input switch 11, the receiving-side output switch 25 is formed by using a CMOS circuit.

The four transistors Tr5 to Tr8 are connected in series between a power supply potential VDD and a ground potential. The two transistors Tr5 and Tr6 located on the power supply potential VDD side are PMOS transistors, and the two transistors Tr7 and Tr8 located on the ground potential side are NMOS transistors. A node between the transistors Tr6 and Tr7 serves as an output of a digital signal to the first port 32.

A detection signal R[1] and its inverted signal R[1]_b are input to the gates of the transistors Tr7 and Tr6, respectively. Therefore, when the detection signal R[1] is at an H-level, the transistors Tr6 and Tr7 are turned on, and when the detection signal R[1] is at an L-level, the transistors Tr6 and Tr7 are turned off. Therefore, when the communication circuit is not in the receiving state, the output to the first port 32 is disconnected from the power supply potential VDD and the ground potential.

Received data output from the buffer 23 is input to the gates of the transistors Tr5 and Tr8. The transistors Tr5 and Tr8 constitute a CMOS switch circuit. Therefore, when the detection signal R[1] is at an H-level, the potential of the output to the first port 32 becomes the power supply potential VDD or the ground potential according to the received data.

Further, the keeper 25a is connected to the output to the first port 32. In the keeper 25 a, two inverters are connected in a circular configuration. Therefore, the potential at the timing at which the detection signal R[1] changes from an H-level to an L-level is held. That is, the potential of the output to the buffer 12 is maintained at the potential at the timing at which the state of the communication circuit changes from a receiving state to a standby state.

Latches 16 and 26

Figure 13:
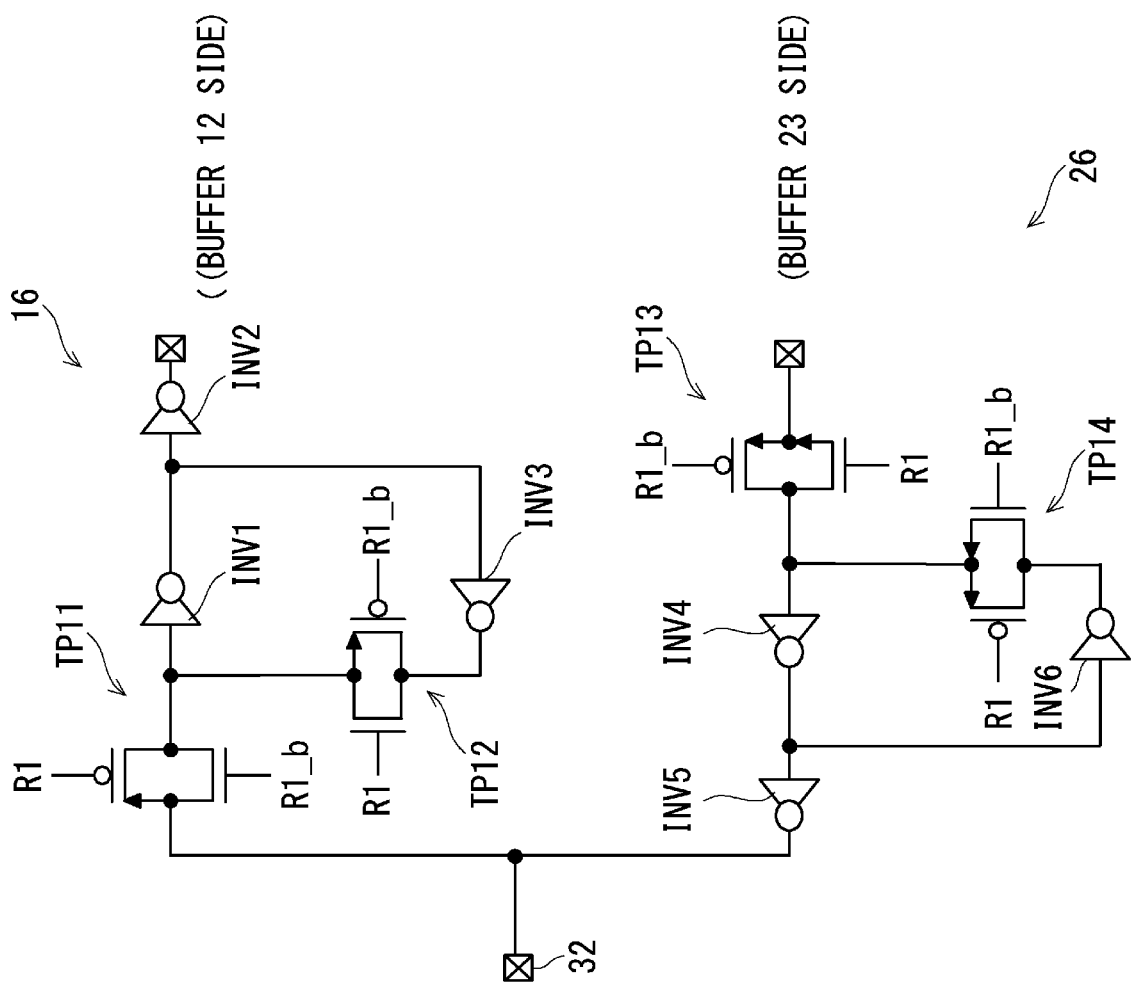
FIG. 13 is a circuit diagram showing a configuration of latches 16 and 26.

FIG. 13 is a circuit diagram of the latches 16 and 26. The latch 16 includes transistor pairs TP11 and TP12, and inverters INV1 to INV3. The latch 26 includes transistor pairs TP13 and TP14, and inverters INV4 to INV6. Similar to the transistor pair TP0 and the like, each of the transistor pairs TP11 to TP14 includes an NMOS transistor and a PMOS transistor connected in parallel. A detection signal R[1] and its inverted signal R[1]_b are input to each of the transistor pairs TP11 to TP14. Therefore, each of the transistor pairs TP11 to TP14 is turned on and off according to the detection signal R[1]. Operation performed by the latches 16 and 26 are similar to those performed in the third embodiment, and therefore descriptions thereof are omitted.

In the latch 16, the transistor pair TP11, the inverter INV1, and the inverter INV2 are connected in series in this order between the first port 32 and an output OUT on the buffer 12 side. The output of inverter INV1 is connected to the input of the inverter INV1 through the inverter INV3 and the transistor pair TP12 in a feedback manner. By using the above-described latch 16, the potential at the time at which the state of the communication circuit changes from a transmitting state to a standby state is maintained. Therefore, the function similar to that of the transmitting-side input switch 11 can be obtained.

In the latch 26, the transistor pair TP13, the inverter INV4, and the inverter INV5 are connected in series in this order between the buffer 23 and the first port 32. The output of inverter INV4 is connected to the input of the inverter INV4 through the inverter INV6 and the transistor pair TP14 in a feedback manner. By using the above-described latch 26, the potential at the time at which the state of the communication circuit changes from a receiving state to a standby state is maintained. Therefore, the function similar to that of the receiving-side output switch 25 can be obtained.

Needless to say, the latch 27 may have a circuit configuration similar to that of the latch 16 or 26. In such a case, the input to the gates of the transistor pair may be changed from the detection signal R[1] to the detection signal TN.

Receiver 22

Figure 14:
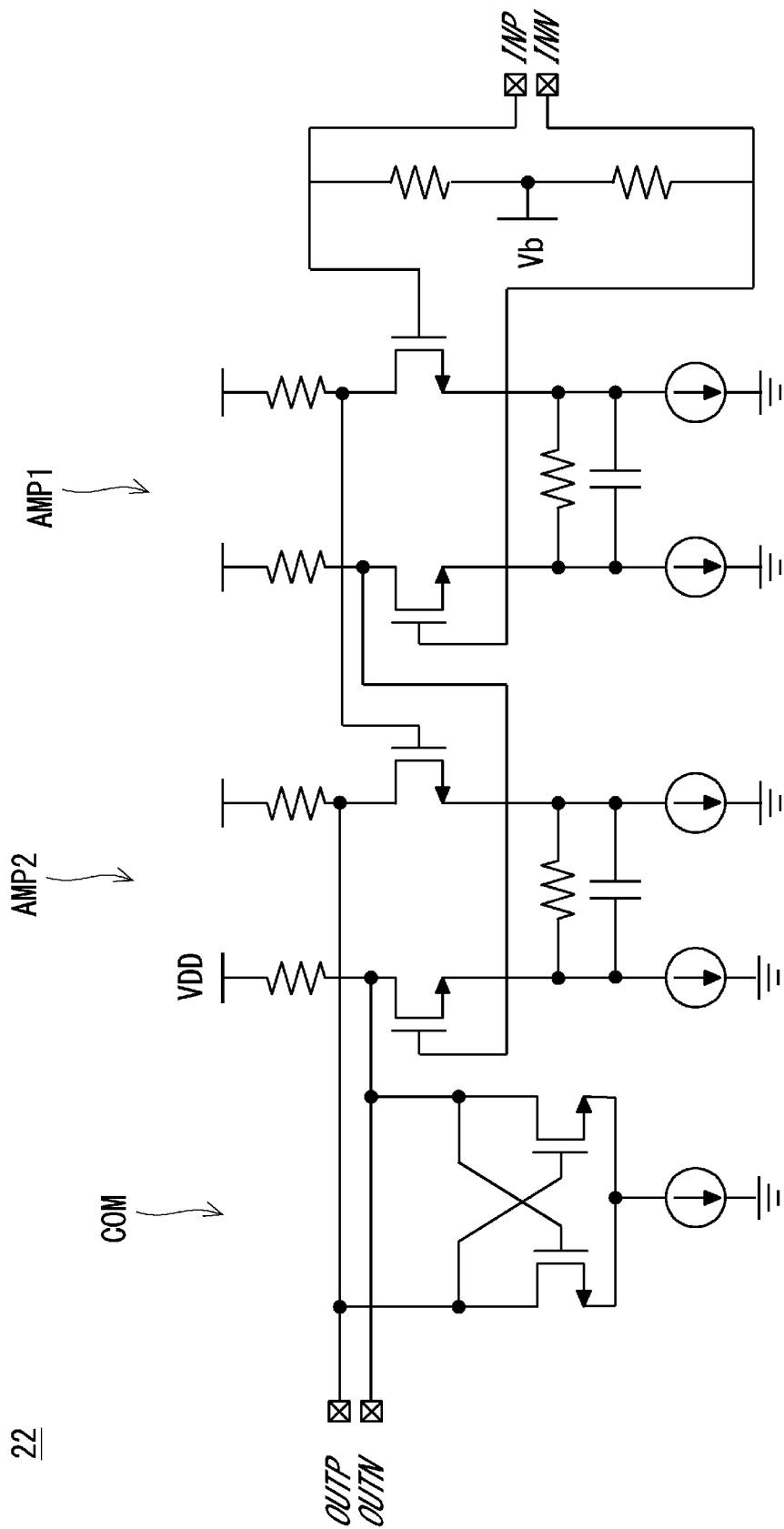
FIG. 14 is a circuit diagram showing a configuration of a receiver 22.

FIG. 14 is a circuit diagram showing a configuration of the receiver 22. Note that although FIG. 14 shows the receiver 22 using a differential transmission scheme, a similar configuration may be applied to a receiver 22 using a single-end transmission scheme. The receiver 22 includes an amplifier AMP1, an amplifier AMP2, and a hysteresis comparator COM.

Two input signals to the receiver 22 are referred to as input signals INP and INN, and two output signals from the receiver 22 are referred to as output signals OUTP and OUTN. The input signals INN and INP are amplified by the two-stage amplifiers AMP1 and AMP2, and the amplified input signals are input to the hysteresis comparator COM. The hysteresis comparator COM compares the two amplified input signals INN and INP with each other while taking hysteresis into consideration.

As described above, the receiver 22 includes the hysteresis comparator COM. Therefore, even when a noise occurs in the pulse signal having the small amplitude output from the first coupler 31, the received data can be accurately restored.

Another Configuration of Receiver 22

Figure 15:
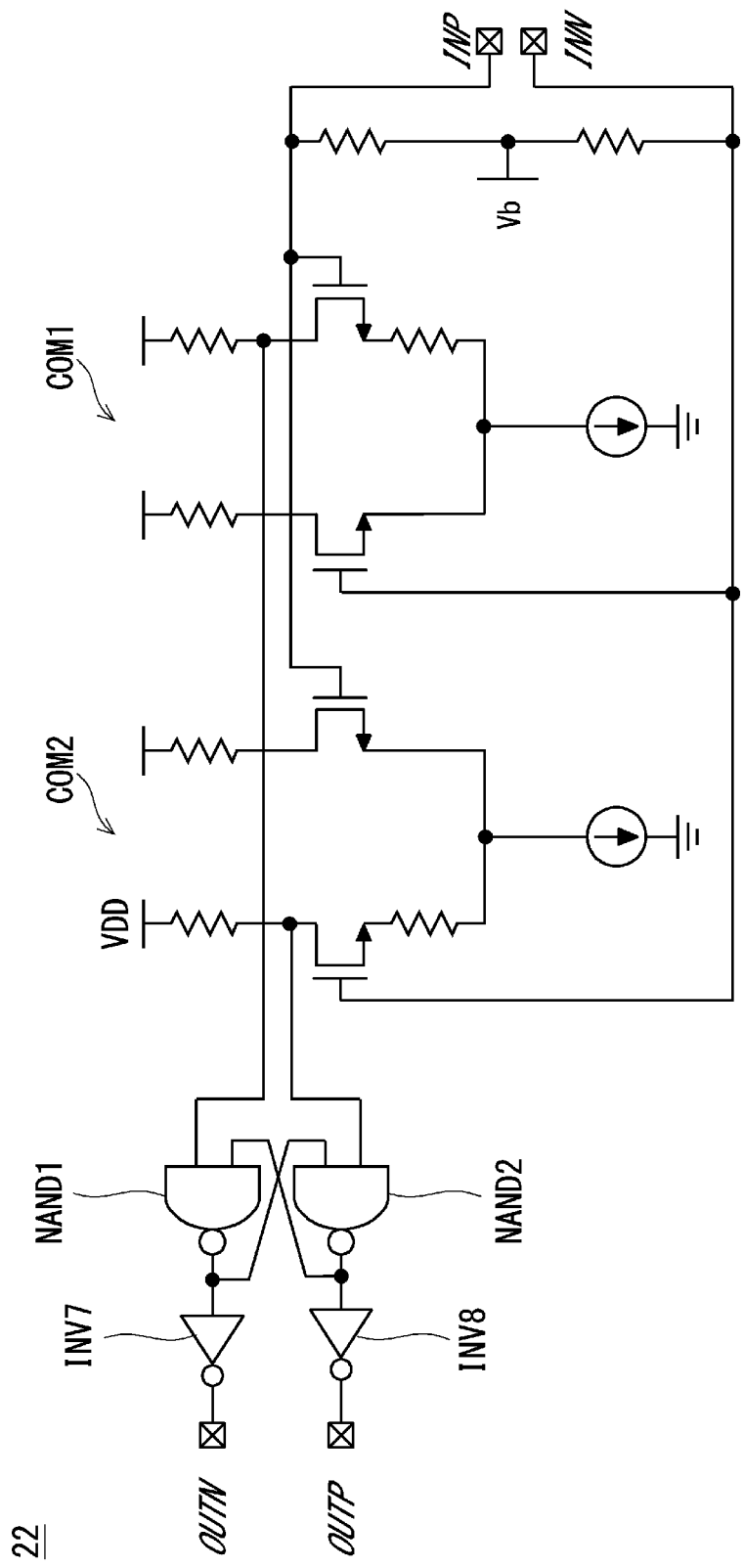
FIG. 15 is a circuit diagram showing another configuration of a receiver 22.

FIG. 15 is a circuit diagram showing another configuration of the receiver 22. Note that although FIG. 15 shows the receiver 22 using a differential transmission scheme, a similar configuration may be applied to a receiver 22 using a single-end transmission scheme. The receiver 22 includes a comparator COM1, a comparator COM2, a NAND circuit NAND1, a NAND circuit NAND2, an inverter INV7, and an inverter INV8. The configuration shown in FIG. 15 is different from that shown in FIG. 14 because no hysteresis comparator is used in FIG. 15. Therefore, the receiver 22 uses two receivers COM1 and COM2.

The output of the comparator COM1 is input to the NAND circuit NAND1. The output of the NAND circuit NAND1 is input to the inverter INV7 and the NAND circuit NAND2. The inverter INV7 outputs an output signal OUTN. The output of the comparator COM2 is input to the NAND circuit NAND2. The output of the NAND circuit NAND2 is input to the inverter INV8 and the NAND circuit NAND1. The inverter INV8 outputs an output signal OUTP.

As shown in FIG. 15, the receiver 22 includes two comparators COM1 and COM2. Since the receiver 22 can have two types of thresholds, it can improve the noise resistance. Therefore, even when a noise occurs in the pulse signal having the small amplitude output from the first coupler 31, the received data can be accurately restored.

Three-State Transmitter 18

Figure 16:
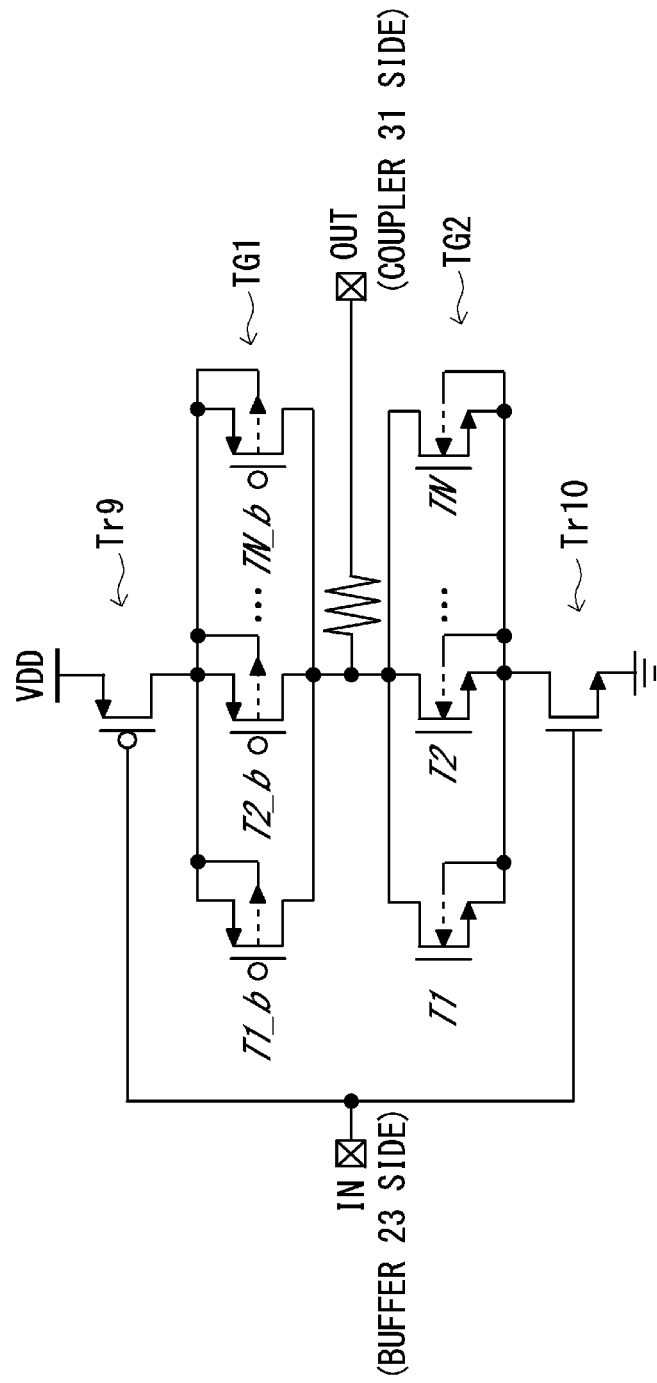
FIG. 16 is a circuit diagram showing a configuration of a three-state transmitter 18.

FIG. 16 is a circuit diagram showing a configuration of the three-state transmitter 18 according to the fourth embodiment. A transistor Tr9, a group of PMOS transistors (hereinafter referred to as the PMOS transistor group) TG1, a group of NMOS transistors (hereinafter referred to as the NMOS transistor group) TG2, and a transistor Tr10 are connected in series between a power supply potential VDD and a ground potential. In FIG. 16, an input from the buffer 23 is referred to as an input IN, and an output to the first coupler 31 is referred to as an output OUT. The transistors Tr9 and Tr10 are a PMOS transistor and an NMOS transistor, respectively, and constitute a CMOS switch circuit.

The gates of the transistors Tr9 and Tr10 are connected to the input IN from the buffer 23. The PMOS transistor group TG1 includes N PMOS transistors connected in parallel. Inverted signals T1_b, T2_b, . . . TN_b of detection signals T1, T2, . . . TN are input to the gates of the N PMOS transistors, respectively. The NMOS transistor group TG2 includes N NMOS transistors arranged in parallel. The detection signals T1, T2, . . . TN are input to the gates of the N NMOS transistors, respectively.

A node between the PMOS transistor group TP1 and the NMOS transistor group TP2 is connected to the output OUT through a resistor. When the detection signals T1, T2, . . . TN are all at H-levels, the output OUT is disconnected from the power supply potential VDD and the ground potential. Therefore, the output of the three-state transmitter 18 becomes a Hi-Z. When the detection signals T1, T2, . . . TN are all at L-levels, the output OUT is connected to the power supply potential VDD or the ground potential through the resistor. Therefore, the output of the three-state transmitter 18 becomes an H-level or an L-level according to the received data from the input IN.

As described above, when the detection signals T1, T2, . . . TN are all at L-levels, the output OUT of the three-state transmitter 18 becomes a Hi-Z. When the detection signals T1, T2, . . . TN are all at H-levels, the output OUT of the three-state transmitter 18 becomes an H-level or an L-level according to the received data.

Further, when the state of the communication circuit changes from a transmitting state to a standby state, the detection signals T1, T2, . . . TN change from H-levels to L-levels one by one. Therefore, the impedance of the three-state transmitter 18 gradually increases. Then, when the last detection signal TN becomes an L-level, the output OUT becomes a Hi-Z. Further, by appropriately setting the on-resistances of the transistors of the PMOS transistor group TP1 and the NMOS transistor group TP2, the output side of the three-state transmitter 18 is disconnected from the first coupler 31 so that the change in the output of the transmitter is not detected in the receiver of the communication circuit 100.

Another Configuration of Three-State Transmitter 18

Figure 17:
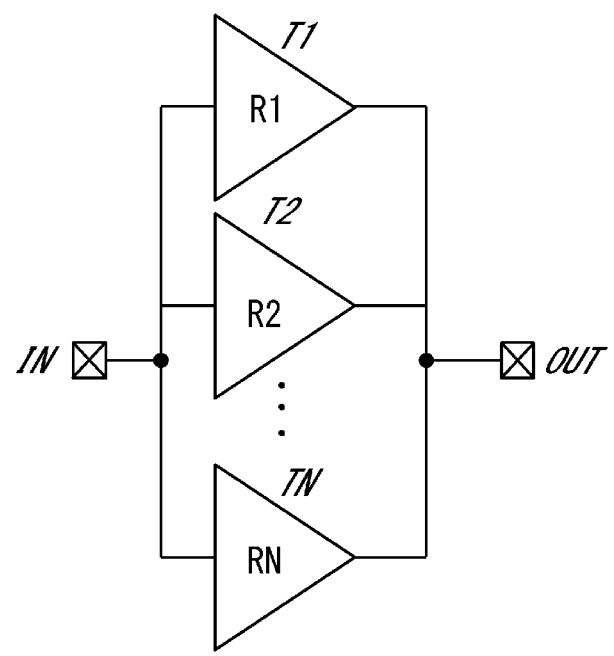
FIG. 17 is a circuit diagram showing another configuration of a three-state transmitter 18.

Another configuration of the three-state transmitter 18 will be described with reference to FIGS. 17 and 18. FIG. 17 shows an overall configuration of the three-state transmitter 18. N resistive circuits R1, R2, . . . RN are arranged in parallel between the input IN and the output OUT of the three-state transmitter 18.

Figure 18:
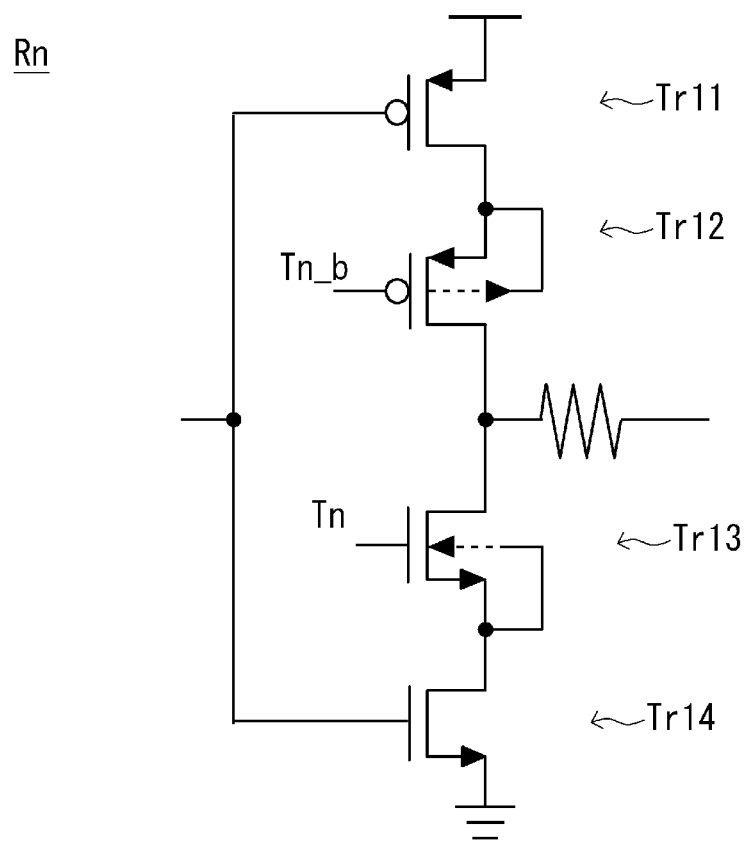
FIG. 18 is a circuit diagram showing another configuration of a three-state transmitter 18.

FIG. 18 is a circuit diagram showing a configuration of arbitrarily selected one resistive circuit Rn among the N resistive circuits R1, R2, . . . RN (i.e., n is an arbitrary integer between 1 and N). The resistive circuit Rn includes transistors Tr11 to Tr14. Specifically, it has a configuration that is obtained by replacing the PMOS transistor group TP1 and the NMOS transistor group TP2 in the configuration shown in FIG. 16 by a single PMOS transistor Tr12 and a single MMOS transistor Tr13, respectively. Further, a detection signal Tn is input to the gates of the PMOS transistor Tr12 and the NMOS transistor Tr14. Therefore, the same advantageous effects as those of the three-state transmitter 18 shown in FIG. 16 can be achieved.

The present invention is not limited to the above-described embodiments, and they may be modified as appropriate without departing from the spirit and scope of the invention.

REFERENCE SIGNS LIST

1 COMMUNICATION CIRCUIT
10 TRANSMITTING PATH
11 TRANSMITTING-SIDE INPUT SWITCH
12 BUFFER
13 TRANSMITTER
14 TRANSMISSION DATA CHANGE DETECTOR
15 TRANSMITTING-SIDE OUTPUT SWITCH
16 LATCH
18 THREE-STATE TRANSMITTER
20 RECEIVING PATH
21 RECEIVING-SIDE INPUT SWITCH
22 RECEIVER
23 BUFFER
24 RECEIVED DATA CHANGE DETECTOR
25 RECEIVING-SIDE OUTPUT SWITCH
26 LATCH
27 LATCH
31 COUPLER
32 FIRST PORT
100 COMMUNICATION CIRCUIT
131 COUPLER

The invention claimed is:

1. A communication circuit comprising:
a first coupler configured to be electromagnetically coupled to a coupler of an entity with which the communication circuit communicates;
a first port configured to receive transmission data transmitted from the first coupler and output received data received by the coupler;
a transmitting path through which the transmission data is transmitted from the first port to the first coupler;
a receiving path through which the received data is transmitted from the first coupler to the first port;
a transmitter disposed in the transmitting path, the transmitter being configured to output the transmission data received from the first port to the first coupler;
a receiver disposed in the receiving path, the receiver being configured to restore the received data received through the first coupler;
a transmission-data change detector configured to detect a change in the transmission data input to the transmitter in the transmitting path; and
a received-data change detector configured to detect a change in the received data output from the receiver in the receiving path, wherein
in a receiving state in which the received-data change detector detects a change in the received data, the first port is connected to the first coupler through the receiving path, and the transmitter is disconnected from the first port and the first coupler in the transmitting path,
in a transmitting state in which the transmission-data change detector detects a change in the transmission data, the first port is connected to the first coupler through the transmitting path, and the first port is disconnected from the receiver in the receiving path, and
in a standby state in which the received-data change detector and the transmission-data change detector detect no change in the received data and the transmission data, an input side of the receiver is connected to the first coupler and an output side of the receiver is disconnected from the first port in the receiving path, and an input side of the transmitter is connected to the first port and an output side of the transmitter is disconnected from the first coupler in the transmitting path.

2. The communication circuit according to claim 1, wherein when the state of the communication circuit changes from the transmitting state to the standby state, the output side of the transmitter is disconnected from the first coupler so that a change in an output of the transmitter is not detected in the receiver of the entity.

3. The communication circuit according to claim 1, wherein
the transmission-data change detector outputs N detection signals, wherein N is an integer equal to or greater than two, and
when the state of the communication circuit changes from the transmitting state to the standby state, an impedance between the output side of the transmitter and the first coupler is increased in a stepwise manner according to the N detection signals.

4. The communication circuit according to claim 1, further comprising a transmitting-side output switch disposed between the transmitter and the first coupler, wherein
when the state of the communication circuit changes from the transmitting state to the standby state, an impedance of the transmitting-side output switch is gradually increased.

5. The communication circuit according to claim 1, wherein
the transmitter is a three-state transmitter capable of outputting an H-level (1), an L-level (0), and a Hi-Z (a high impedance),
in the receiving state, an output of the three-state transmitter becomes the Hi-Z, so that the transmitter is disconnected from the first coupler, and
when the state of the communication circuit changes from the transmitting state to the standby state, an impedance of the three-state transmitter is gradually increased.

6. The communication circuit according to claim 1, further comprising:
a transmitting-side input switching circuit configured to switch a state of the transmitting path between a disconnected state and a connected state between the transmitter and the first port according to a detection signal received from the received-data change detector; and
a receiving-side output switching circuit configured to switch a state of the receiving path between a disconnected state and a connected state between the receiver and the first port according to the detection signal received from the received-data change detector.

7. The communication circuit according to claim 6, wherein
the transmitting-side input switching circuit is a switch with a latch or a keeper, and
the receiving-side output switching circuit is a switch with a latch or a keeper.

8. The communication circuit according to claim 6, further comprising a receiving-side input switching circuit configured to switch a state of the receiving path between a connected state and a disconnected state between the first coupler and the receiving-side output switching circuit according to a detection signal received from the transmission-data change detector.

9. The communication circuit according to claim 6 or 7, further comprising a receiving-side output switch configured to switch a state of the receiving path between a connected state and a disconnected state between the receiver and the first coupler according to a detection signal received from the transmission-data change detector.

10. The communication circuit according to claim 1, further comprising a second coupler connected to the first port, wherein
data received by the second coupler is transmitted as the transmission data to the first coupler through the transmitting path, and
data received by the first coupler is transmitted as the received data to the second coupler through the receiving path.

11. A communication method performed by a communication circuit,
the communication circuit comprising:
a first coupler configured to be electromagnetically coupled to a coupler of an entity with which the communication circuit communicates;
a first port configured to receive transmission data transmitted from the first coupler and output received data received by the coupler;
a transmitting path through which the transmission data is transmitted from the first port to the first coupler;
a receiving path through which the received data is transmitted from the first coupler to the first port;
a transmitter disposed in the transmitting path, the transmitter being configured to output the transmission data received from the first port to the first coupler;
a receiver disposed in the receiving path, the receiver being configured to restore the received data received through the first coupler;
a transmission-data change detector configured to detect a change in the transmission data input to the transmitter in the transmitting path; and
a received-data change detector configured to detect a change in the received data output from the receiver in the receiving path, wherein
in a receiving state in which the received-data change detector detects a change in the received data, the first port is connected to the first coupler through the receiving path, and the transmitter is disconnected from the first port and the first coupler in the transmitting path,
in a transmitting state in which the transmission-data change detector detects a change in the transmission data, the first port is connected to the first coupler through the transmitting path, and the first port is disconnected from the receiver in the receiving path, and
in a standby state in which the received-data change detector and the transmission-data change detector detect no change in the received data and the transmission data, an input side of the receiver is connected to the first coupler and an output side of the receiver is disconnected from the first port in the receiving path, and an input side of the transmitter is connected to the first port and an output side of the transmitter is disconnected from the first coupler in the transmitting path.

* * * * *

UNITED STATES PATENT AND TRADEMARK OFFICE
CERTIFICATE OF CORRECTION

PATENT NO. : 11,349,522 B2
APPLICATION NO. : 17/268524
DATED : May 31, 2022
INVENTOR(S) : Tadahiro Kuroda It is certified that error appears in the above-identified patent and that said Letters Patent is hereby corrected as shown below:

On the Title Page

Item (54) and in the Specification, Column 1, Lines 1-2 read:
"COMMUNICATION CIRCUIT AND COMMUNICATION MEIHOD"
But should read:
-- COMMUNICATION CIRCUIT AND COMMUNICATION METHOD --

In the Claims

Column 23, Line 57 reads:
"9. The communication circuit according to claim 6 or 7,"
But should read:
-- 9. The communication circuit according to claim 6, --

Signed and Sealed this
Thirtieth Day of August, 2022

Katherine Kelly Vidal
*Director of the United States Patent and Trademark Office*